(12) United States Patent
Atsuta

(10) Patent No.: US 10,742,139 B2
(45) Date of Patent: Aug. 11, 2020

(54) METHOD OF DRIVING VIBRATION ACTUATOR, DRIVE DEVICE, AND IMAGE PICKUP APPARATUS

(71) Applicant: CANON KABUSHIKI KAISHA, Tokyo (JP)

(72) Inventor: Akio Atsuta, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 527 days.

(21) Appl. No.: 15/504,817

(22) PCT Filed: Oct. 6, 2015

(86) PCT No.: PCT/JP2015/078859
§ 371 (c)(1),
(2) Date: Feb. 17, 2017

(87) PCT Pub. No.: WO2016/056667
PCT Pub. Date: Apr. 14, 2016

(65) Prior Publication Data
US 2017/0279380 A1    Sep. 28, 2017

(30) Foreign Application Priority Data

Oct. 10, 2014  (JP) ................................ 2014-208781
Sep. 9, 2015   (JP) ................................ 2015-177547

(51) Int. Cl.
*H02N 2/14*      (2006.01)
*B23Q 1/34*      (2006.01)
(Continued)

(52) U.S. Cl.
CPC ............. *H02N 2/142* (2013.01); *B23Q 1/34* (2013.01); *B23Q 5/50* (2013.01); *G02B 7/04* (2013.01);
(Continued)

(58) Field of Classification Search
CPC ... B23Q 1/34; B23Q 5/50; G02B 7/04; G02B 7/08; H02N 2/001; H02N 2/142; H02N 2/163
See application file for complete search history.

(56) References Cited

U.S. PATENT DOCUMENTS 5,231,325 A   7/1993  Tamai et al.
5,436,522 A   7/1995  Tsukimoto et al.
(Continued)

FOREIGN PATENT DOCUMENTS

EP   0 602 635 A1   6/1994
EP   2 017 903 A2   1/2009
JP   04-91671 A     3/1992

OTHER PUBLICATIONS

International Search Report and Written Opinion of International Application No. PCT/JP2015/078859.

*Primary Examiner* — Muhammad S Islam
(74) *Attorney, Agent, or Firm* — Venable LLP

(57) ABSTRACT

A drive device for a vibration actuator, which makes it possible to perform low-speed and stable driving and expand a dynamic range of driving speed, includes first and second switching circuits, a position detection sensor, and a microprocessing unit (MPU). The first switching circuit and the second switching circuit apply a first drive signal and a second drive signal, for exciting vibration, to an electromechanical energy conversion element of a vibrating body. The position detection sensor acquires information on a relative position between the vibrating body and a driven body in press contact with each other. The MPU switches the first and second drive signals to third drive and fourth drive signals, respectively, based on the acquired information, to thereby change a position at which a highest one of peaks of amplitude of vibration excited in the vibrating body is formed.

16 Claims, 16 Drawing Sheets

(51) Int. Cl.
*G02B 7/04* (2006.01)
*H02N 2/16* (2006.01)
*H02N 2/00* (2006.01)
*G02B 7/08* (2006.01)
*B23Q 5/50* (2006.01)

(52) U.S. Cl.
CPC ............... *G02B 7/08* (2013.01); *H02N 2/001* (2013.01); *H02N 2/163* (2013.01)

(56) References Cited

U.S. PATENT DOCUMENTS

| | | | |
|---|---|---|---|
| 5,612,598 A | 3/1997 | Fukui et al. | |
| 5,739,621 A | 4/1998 | Atsuta et al. | |
| 5,920,144 A | 7/1999 | Atsuta | |
| 5,986,385 A | 11/1999 | Atsuta | |
| 6,031,316 A * | 2/2000 | Kataoka | H02N 2/0015 310/316.02 |
| 6,037,701 A | 3/2000 | Atsuta | |
| 6,072,267 A | 6/2000 | Atsuta | |
| 6,100,622 A * | 8/2000 | Yamamoto | H02N 2/14 310/316.01 |
| 6,107,720 A | 8/2000 | Atsuta | |
| 6,121,714 A | 9/2000 | Atsuta | |
| 6,133,671 A | 10/2000 | Atsuta et al. | |
| 6,177,753 B1 | 1/2001 | Atsuta | |
| 6,376,965 B1 | 4/2002 | Kataoka et al. | |
| 6,608,426 B2 | 8/2003 | Hayashi et al. | |
| 6,635,977 B2 | 10/2003 | Kataoka et al. | |
| 7,701,116 B2 | 4/2010 | Atsuta | |
| 9,000,691 B2 | 4/2015 | Atsuta | |
| 2002/0121869 A1* | 9/2002 | Kataoka | H02N 2/14 318/114 |
| 2012/0286704 A1* | 11/2012 | Nitto | H02N 2/142 318/116 |
| 2014/0145649 A1* | 5/2014 | Atsuta | H02N 2/103 318/116 |
| 2015/0125140 A1* | 5/2015 | Ashizawa | H02N 2/163 396/125 |

* cited by examiner

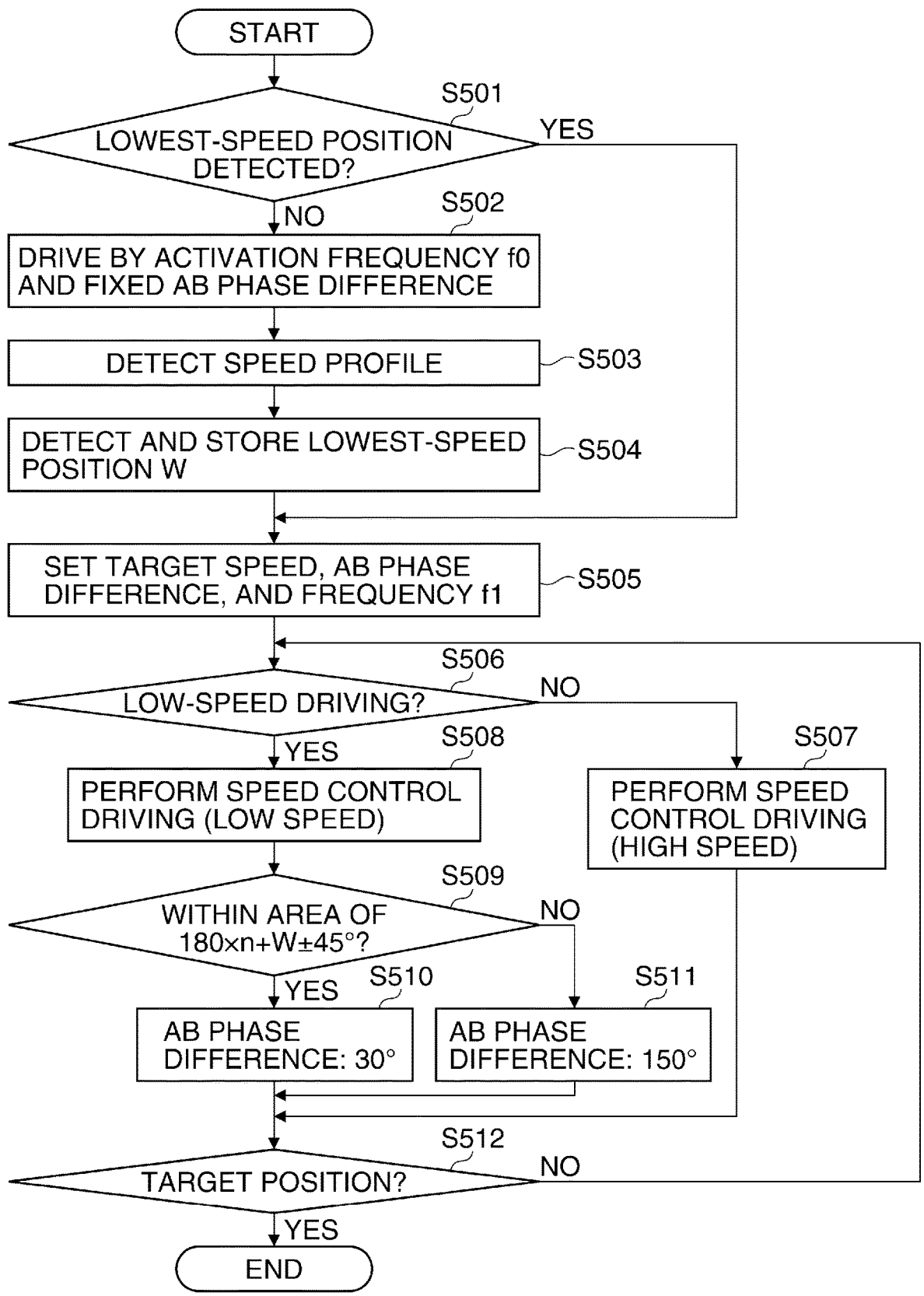

US 10,742,139 B2

METHOD OF DRIVING VIBRATION ACTUATOR, DRIVE DEVICE, AND IMAGE PICKUP APPARATUS

TECHNICAL FIELD

The present invention relates to drive control of a vibration actuator in which a predetermined drive signal is applied to an electromechanical energy conversion element to thereby generate vibrations in a vibrating body, and a driven body in contact with the vibrating body is caused to be moved relative to the vibrating body.

BACKGROUND ART

Conventionally, a vibration actuator is known in which drive signals are applied to an electromechanical energy conversion element to thereby generate, in a vibrating body, driving vibrations in a plurality of bending modes in which the manner of bending is the same but the direction of bending is different, whereby a driven body brought into pressure or press contact with the vibrating body is frictionally driven (see e.g. PTL 1).

FIG. 14 is a perspective view of the vibration actuator 200. Further, FIG. 15 is an exploded perspective view of the vibration actuator 200 shown in FIG. 14. The vibration actuator 200 is comprised of a first elastic body 201, a piezoelectric unit 202, a flexible printed wiring board 203, a lower nut 204, a second elastic body 205, a shaft 206, a driven body 207, a gear 209, a coil spring 210, a fixing member 211, and an upper nut 212.

The first elastic body 201 is a disk-shaped member formed by a material, such as a metal, with a small vibration attenuation loss. The flexible printed wiring board 203 electrically connects a drive power source, not shown, and the piezoelectric unit 202. A drive signal is applied to a piezoelectric element as the electromechanical energy conversion element forming the piezoelectric unit 202 from the power source, not shown, via the flexible printed wiring board 203, whereby predetermined vibrations are generated in the piezoelectric unit 202.

The lower nut 204 is fitted on a screw portion formed in a lower end of the shaft 206. The shaft 206 is inserted into through holes formed in the respective central portions of the first elastic body 201, the piezoelectric unit 202, the flexible printed wiring board 203, and the second elastic body 205. Steps are provided at a generally central portion of the shaft 206 in a thrust direction thereof. Each of the steps is brought into abutment with an associated one of steps formed on an inner wall of the second elastic body 205. Further, a thread 231 is formed on an end of the shaft 206 toward the lower nut 204. The thread 231 is screwed into the lower nut 204 which is a fastening member, whereby the second elastic body 205, the first elastic body 201, the piezoelectric unit 202, and the flexible printed wiring board 203 are fastened and fixed by the shaft 206 and the lower nut 204 in the thrust direction of the shaft 206.

A contact spring portion having a spring property is formed at a lower part of the driven body 207. A surface of the first elastic body 201 on a side not in contact with the piezoelectric unit 202 is brought into pressure contact with the contact spring portion formed at the lower part of the driven body 207, whereby the driven body 207 receives a frictional driving force generated by the first elastic body 201. The gear 209 is an output unit for taking out a rotational output of the driven body 207 from the vibration actuator 200. The gear 209 is fitted on the driven body 207 such that the gear 209 permits the movement of the driven body 207 in the direction of a rotational axis, and rotates in unison with the driven body 207. The coil spring 210 as a pressure unit is disposed between a spring receiving portion of the driven body 207 and the gear 209, and urges the driven body 207 such that the driven body 207 is pushed down toward the first elastic body 201.

The gear 209 is supported by the fixing member 211 coupled to the shaft 206 in a manner rotatable about the shaft 206. Further, the position of the shaft 206 in the thrust direction is restricted by the fixing member 211. A thread 232 is formed also on an end of the shaft 206 toward the upper nut 212. The thread 232 is screwed into the upper nut 212, whereby the shaft 206 is fixed to the fixing member 211. The fixing member 211 is formed with screw holes. By attaching the fixing member 211 to a desired location of a desired member with screws, not shown, it is possible to attach the vibration actuator 200 to the desired location of the desired member.

FIG. 16 is an exploded perspective view of the piezoelectric unit 202. The piezoelectric unit 202 has a structure of a laminate of respective layers of a piezoelectric element 250_1 having the flexible printed wiring board 203 attached thereto, and a plurality of piezoelectric elements 250_2 to 250_n each having electrodes formed on one side thereof. The piezoelectric element 250_2 has driving electrodes A, A', B and B', and a vibration detection electrode S. The piezoelectric elements 250_3 to 250_n each have driving electrodes A, A', B and B' formed in a manner spaced from each other with a generally cross-shaped insulating portion therebetween. Each of the associated electrodes of the piezoelectric elements 250_1 to 250_n is electrically connected in a lamination direction e.g. by burying a conductive material in through holes formed in the piezoelectric elements 250_1 to 250, whereby each electrode is supplied with electric power via the through holes.

Note that in FIG. 16, the through holes and the electrodes electrically connected in the lamination direction are denoted by the same reference numerals (A, A', B and B'). For example, the through holes A of the piezoelectric element 250_3 are electrically connected to the respective associated electrodes A of the piezoelectric element 250_4. Further, the electrodes of the piezoelectric elements 250_3 to 250_n are each formed as four areas spaced from each other with the generally cross-shaped insulating portion therebetween so as to make effective use of the driving force of the vibration actuator 200, but detailed description thereof is omitted. Piezoelectric bodies of the piezoelectric elements 250_2 to 250_n−1 are each oppositely polarized in the lamination direction on a layer-by-layer basis.

Drive signals different in phase are applied from the flexible printed wiring board 203 to the electrodes A, A', B and B' via the through holes formed in the piezoelectric element 250_1, whereby driving by the vibration actuator 200 is realized. The electrodes A and B as well as the electrodes A' and B' are shifted from each other by 90° in position phase. The drive signals applied to the respective electrodes A' and B' are shifted from the drive signals applied to the respective electrodes A and B by 180° in time phase, respectively. For example, when the drive signals shifted from each other by 180° in time phase are applied to the electrodes A and A', areas of the electrodes A of each piezoelectric body expand in a direction of the thickness thereof, but areas of the electrodes A' of each piezoelectric body contract in the direction of the thickness thereof. As a consequence, a bending vibration in which the piezoelectric unit 202 bends around the shaft 206 in an electrode A-electrode A' direction is generated, thereby shaking the first elastic body 201 in the electrode A-electrode A' direction.

Here, if the drive signals shifted from the respective drive signals applied to the electrodes A and A' by 90° in time phase are applied to the electrodes B and B', respectively, two bending vibrations, i.e. the above-mentioned bending vibration which shakes the first elastic body 201 in the electrode A-electrode A' direction, and a bending vibration which shakes the first elastic body 201 in an electrode B-electrode B' direction, are generated in the piezoelectric unit 202. These vibrations are combined to thereby excite progressive elliptic motions in the surface of the first elastic body 201. In the vibration actuator 200, the driven body 207 (the contact spring portion thereof) is brought into pressure contact with the surface of the first elastic body 201, in which the elliptic motion has been excited, and therefore the driven body 207 is moved (rotated) in a manner pushed forward by the elliptic motion of the first elastic body 201.

For example, in a case where a focus lens of an image pickup apparatus is driven using the vibration actuator 200, the vibration actuator 200 is required to be adapted to the motion of the focus lens for focusing on an object at a high speed and the motion of the same for continuing to focus on an object the position of which is being shifted slowly. To meet this requirement, the vibration actuator 200 is required to be capable of operating in a speed range of ten or more times in terms of a speed ratio between high and low speeds. Particularly, there is an increasing need for stably driving the focus lens at a low speed. To meet such requirements, as a method of driving the vibration actuator 200 at a low speed, there has been proposed a method in which the phase differences between drive signals applied to the electrodes A, A', B, and B' are changed to reduce a vibration amplitude in a direction of driving the focus lens.

CITATION LIST

Patent Literature

PTL 1: Japanese Patent Laid-Open Publication No. H04-91671

SUMMARY OF INVENTION

Technical Problem

In the vibration actuator 200, however, the method of reducing the rotational speed of the driven body 207 by the phase difference control of changing the phase differences between the drive signals applied to the electrodes A, A', B, and B' suffers from problems described hereafter. Here, a description will be given of manners and problems of high-speed driving and low-speed driving performed by the phase difference control.

FIGS. 17A to 17D are schematic diagrams useful in explaining vibrations excited in the first elastic body 201 when the driven body 207 is driven at a high speed. Here, it is assumed that a drive signal for generating a first bending vibration is applied to the electrodes A and A', and a drive signal for generating a second bending vibration is applied to the electrodes B and B'. Hereinafter, in the piezoelectric unit 202, areas driven by the drive signals applied to the electrodes A and A' are referred to as the "phase A" and the "phase A'", respectively, and areas driven by the drive signals applied to the electrodes B and B' are referred to as the "phase B" and the "phase B'", respectively. Note that the phase A and the phase A' are shifted from each other by 180° in position phase, and the phase B and the phase B' are shifted from each other by 180° in position phase. In FIGS. 17A to 17D, and FIGS. 18A to 18D, referred to hereinafter, the phase A' is indicated by a letter A with "- (bar)" thereover, and the phase B' is indicated by a letter B with "- (bar)" thereover.

FIGS. 17A to 17D show states in which an elliptic motion is generated in the first elastic body 201 when the drive signals shifted from each other by 90° (or -90°) in time phase are applied in the order of the electrodes A, B, A', and B'. In FIG. 17A, an x-axis represents a circumferential direction (i.e. a feeding direction of a vibration amplitude generated in the first elastic body 201). When the rotational speed of the driven body 207 is small, a component (x-direction component) of the vibration amplitude in the feeding direction is small. Further, a y-axis represents a direction of the symmetrical axis of the first elastic body 201 (a direction of the thickness of the first elastic body 201, i.e. a displacement direction of the vibration amplitude occurring in the first elastic body 201). When the displacement of the vibration amplitude is small, a component (y-direction component) of the vibration amplitude in the displacement direction is small.

Here, the contact spring portion formed at the lower part of the driven body 207 has a spring property for following the vibration of the first elastic body 201. After machining the driven body 207, the contact spring portion thereof usually has a shape having two convex portions in the circumferential direction by stress or the like during machining of the driven body 207, and hence the contact spring portion is brought into contact with the first elastic body 201 at the convex portions with strong pressure. Hereinafter, the portions formed in the contact spring portion of the driven body 207 in a manner protruding toward the first elastic body 201 are referred to as the "convex portions of the driven body 207". Note that in the illustrated examples, the convex and concave degrees are illustrated in an exaggerated manner.

According to the driving method shown in FIGS. 17A to 7D, a contact point where the first elastic body 201 and the convex portion of the driven body 207 are in contact with each other is changed from a position b to a position c by the movement of the driven body 207 (FIG. 17A→FIG. 17B→FIG. 17C→FIG. 17D). However, the x-direction component and y-direction component of the vibration amplitude are the same in every position. This enables the driven body 207 to constantly receive the same driving force (thrust) from the first elastic body 201 for movement.

In the method of driving the vibration actuator 200, described with reference to FIGS. 17A to 17D, it is possible to adjust the moving (rotational) speed of the driven body 207 by adjusting the voltages and frequencies of the drive signals. According to this adjustment method, however, when the vibration actuator 200 is driven at a low speed, the x-direction component and y-direction component of the vibration amplitude are set to be small, but if they are set to be too small, the rotational speed of the driven body 207 sharply decreases, which makes it impossible to stably rotate the driven body 207. To solve this problem, a method of changing the phase differences between the drive signals applied to the electrodes A, A', B and B' is used.

FIGS. 18A to 18D are schematic diagrams useful in explaining vibrations excited in the first elastic body 201 when the driven body 207 is driven at a low speed. FIGS. 18A to 18D show vibrations generated in the first elastic body 201 and manners of contact between the first elastic body 201 and the driven body 207, in a case where the drive signals are applied by making the difference in time phase between the electrodes A and B and the difference in time phase between the electrodes A' and B' smaller than 90°. More specifically, the drive signals applied to the electrodes A' and B' are shifted by 180° in time phase from the drive signals applied to the electrodes A and B, respectively, and the drive signals applied to the electrodes B and B' are shifted by 30° in time phase from the drive signals applied to the electrodes A and A', respectively.

It is understood from FIGS. 18A to 18D that in the first elastic body 201, non-uniformity of the vibration amplitude is generated in which places where the vibration amplitude is large and places where the vibration amplitude is small are distributed. In FIG. 18A, the convex portions of the driven body 207 and portions of the first elastic body 201 where the y-direction component of the vibration amplitude is small substantially coincide with each other. At this time, the driven body 207 and the first elastic body 201 are brought into contact with each other at the positions b and d with the largest pressure, but at the positions b and d, although the x-direction component of the vibration amplitude generated in the first elastic body 201 is large, the y-direction component is small, which leads to an increase in contact load. To cause rotation of the driven body 207 in this state, a vibration amplitude having the y-direction component large enough to overcome this contact load is required. Here, by increasing the whole vibration amplitude, it is possible to achieve displacement of the vibration amplitude for rotating the driven body 207, but in this case, the x-direction component of the vibration amplitude becomes large, whereby the driven body 207 is rotated at a high speed although low speed rotation thereof is desired.

The driven body 207 is moved in the order of FIG. 18A→FIG. 18B→FIG. 18C→FIG. 18D. In the FIG. 18D state, the convex portions of the driven body 207 and portions of the first elastic body 201 where the y-direction component (amount of displacement) of the vibration amplitude becomes the largest coincide with each other, and the driven body 207 and the first elastic body 201 are brought into contact with each other with the largest pressure at the positions a and c. At the positions a and c, the x-direction component of the vibration amplitude is small but the y-direction component thereof is large, and hence the contact load is small, so that the driven body 207 can be moved slowly in the rotational direction. Therefore, if the state shown in FIG. 18D can be always maintained, it is possible to move the driven body 207 at a very low speed.

However, since the driven body 207 is frictionally driven for movement (rotation), a positional relationship between the convex portions of the driven body 207 and the vibration amplitude generated in the first elastic body 201 changes with the elapse of time. Therefore, it is necessary to excite vibrations for continuing to cause rotation of the driven body 207 in the first elastic body 201 in spite of changes in the contact state between the driven body 207 and the first elastic body 201. This makes it impossible to move the driven body 207 at a lower speed than the speed at which the driven body 207 is moved in the contact state shown in FIG. 18A.

Further, during rotation of the driven body 207, the driven body 207 is driven by the first elastic body 201 in a non-uniform vibrational state in which the x-direction component and y-direction component of the vibration amplitude are different, which causes a slip between the driven body 207 and the first elastic body 201 to cause losses of energy e.g. due to heat generation, resulting in degraded driving efficiency. Further, non-uniform contact between the driven body 207 and the first elastic body 201 produces positional differences in the abrasion speed of friction sliding surfaces, and the progress of the non-uniform abrasion of the friction sliding surfaces further causes degradation of driving efficiency and instability of the driving speed.

Solution to Problem

The present invention provides a technique that make it possible to perform low-speed and stable driving of a vibration actuator that excites, in a plurality of different planes, driving vibrations in a plurality of bend modes in which the manner of bending is the same but the direction of bending is different, and increase a dynamic range of driving speed of the driving.

Accordingly, in a first aspect of the invention, there is provided a drive device for a vibration actuator that includes a vibrating body and a driven body in pressure contact with each other, and causes relative movement between the vibrating body and the driven body by vibration excited in the vibrating body, comprising a drive unit configured to apply a first drive signal and a second drive signal for exciting vibration, to an electromechanical energy conversion element of the vibrating body, an acquisition unit configured to acquire information on a relative position between the vibrating body and the driven body, and a control unit configured to switch the first drive signal and the second drive signal applied from the drive unit to the electromechanical energy conversion element, to a third drive signal and a fourth drive signal, respectively, based on the information acquired by the acquisition unit, to thereby change a position at which a largest one of peaks of amplitude of vibration excited in the vibrating body is formed.

Accordingly, in a second aspect of the invention, there is provided an image pickup apparatus comprising a lens, a vibration actuator that moves the lens in an optical axis direction, an image pickup element that picks up an optical image formed by the lens, and a drive device that drives the vibration actuator, the vibration actuator including a vibrating body formed by attaching an electromechanical energy conversion element to an elastic body, and a driven body in pressure contact with the vibrating body, wherein relative movement between the vibrating body and the driven body is caused by vibration excited in the vibrating body, the drive device including a drive unit configured to apply a first drive signal and a second drive signal for exciting vibration, to the electromechanical energy conversion element of the vibrating body, an acquisition unit configured to acquire information on a relative position between the driven body and the vibrating body, and a control unit configured to switch the first drive signal and the second drive signal applied from the drive unit to the electromechanical energy conversion element, to a third drive signal and a fourth drive signal, respectively, based on the information acquired by the acquisition unit, to thereby change a position at which a largest one of peaks of amplitude of vibration excited in the vibrating body is formed.

Accordingly, in a third aspect of the invention, there is provided a method of controlling a drive device for driving a vibration actuator that includes a vibrating body and a driven body in pressure contact with each other, and causes relative movement between the vibrating body and the driven body by vibration excited in the vibrating body, the method comprising applying a first drive signal and a second drive signal for exciting vibration, to an electromechanical energy conversion element of the vibrating body, acquiring information on a relative position between the vibrating body and the driven body, and switching the first drive signal and the second drive signal applied to the electromechanical energy conversion element, to a third drive signal and a fourth drive signal, respectively, based on the information acquired by said acquiring, to thereby change a position at which a largest one of peaks of amplitude of vibration excited in the vibrating body is formed.

Accordingly, in a fourth aspect of the invention, there is provided a method of driving a vibration actuator including a vibrating body formed by attaching an electromechanical energy conversion element to an elastic body, and a driven body in pressure contact with the vibrating body, relative movement between the vibrating body and the driven body being caused by vibration excited in the vibrating body, the method comprising applying a first drive signal and a second drive signal having a predetermined frequency to the electromechanical energy conversion element with a fixed phase difference, thereby exciting progressive vibration in the vibrating body, acquiring a speed profile indicative of a relationship between a position and a speed of the driven body with respect to the vibrating body in a case where the relative movement between the driven body and the vibrating body is caused by the vibration excited in the vibrating body, detecting a lowest-speed position at which the speed of the driven body with respect to the vibrating body becomes lowest, from the speed profile acquired by said acquiring, and acquiring information on a relative position between the driven body and the vibrating body, and switching the first drive signal and the second drive signal applied to the electromechanical energy conversion element to a third drive signal and a fourth drive signal, respectively, based on the information on the relative position and the lowest-speed position, thereby changing a position at which a largest one of peaks of amplitude of the progressive vibration excited in the vibrating body is formed.

Accordingly, in a fifth aspect of the invention, there is provided a method of driving a vibration actuator including a vibrating body formed by attaching an electromechanical energy conversion element to an elastic body, and a driven body in pressure contact with the vibrating body, relative movement between the vibrating body and the driven body being caused by vibration excited in the vibrating body, the method comprising applying a first drive signal and a second drive signal having a predetermined frequency to the electromechanical energy conversion element with a fixed phase difference, thereby exciting progressive vibration in the vibrating body, detecting vibration generated in the vibrating body, acquiring a phase difference profile indicative of a relationship between a position of the driven body with respect to the vibrating body in a case where relative movement between the driven body and the vibrating body is caused by the vibration excited in the vibrating body, and a phase difference between a signal produced by detecting the vibration and the first drive signal or the second drive signal, detecting a lowest-phase difference position at which the phase difference becomes lowest, from the phase difference profile acquired by said acquiring, and acquiring information on a relative position between the driven body and the vibrating body, and switching the first drive signal and the second drive signal applied to the electromechanical energy conversion element to a third drive signal and a fourth drive signal, respectively, based on the information on the relative position and the lowest-phase difference position, thereby changing a position at which a largest one of peaks of amplitude of the progressive vibration excited in the vibrating body is formed.

According to the present invention, it is possible to perform low-speed and stable driving of a vibration actuator that excites, in a plurality of different planes, driving vibrations in a plurality of bend modes in which the manner of bending is the same but the direction of bending is different, and increase a dynamic range of driving speed of the driving.

Further features of the present invention will become apparent from the following description of exemplary embodiments (with reference to the attached drawings).

BRIEF DESCRIPTION OF DRAWINGS

FIG. 5 is a flowchart of a drive control process performed by the drive device shown in FIG. 1, for controlling driving of the vibration actuator shown in FIG. 14.

DESCRIPTION OF EMBODIMENTS

The present invention will now be described in detail below with reference to the accompanying drawings showing embodiments thereof.

Figure 1:
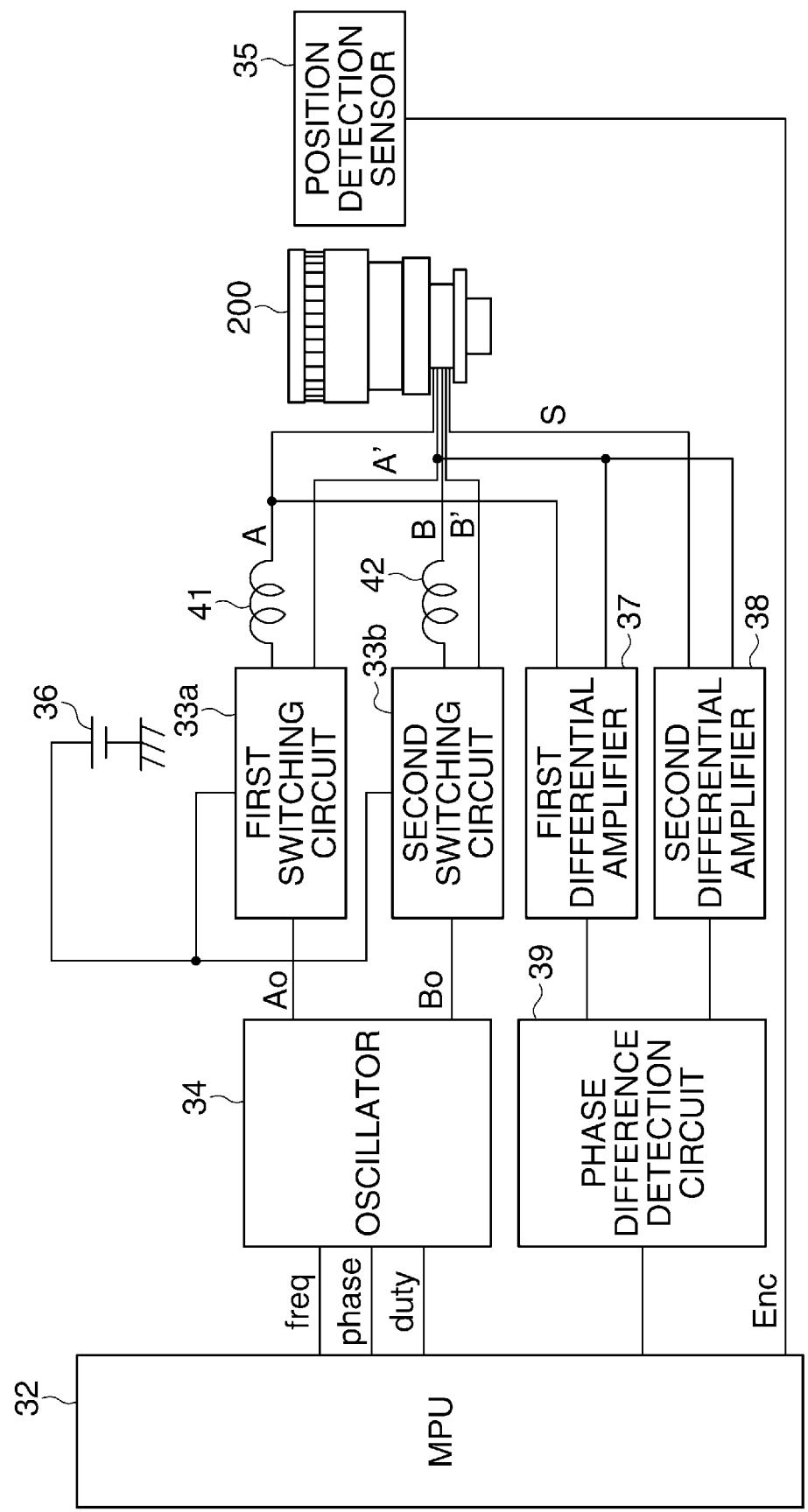
FIG. 1 is a schematic block diagram of the hardware configuration of a drive device according to a first embodiment of the present invention, for driving a vibration actuator shown in FIG. 14.
Figure 14:
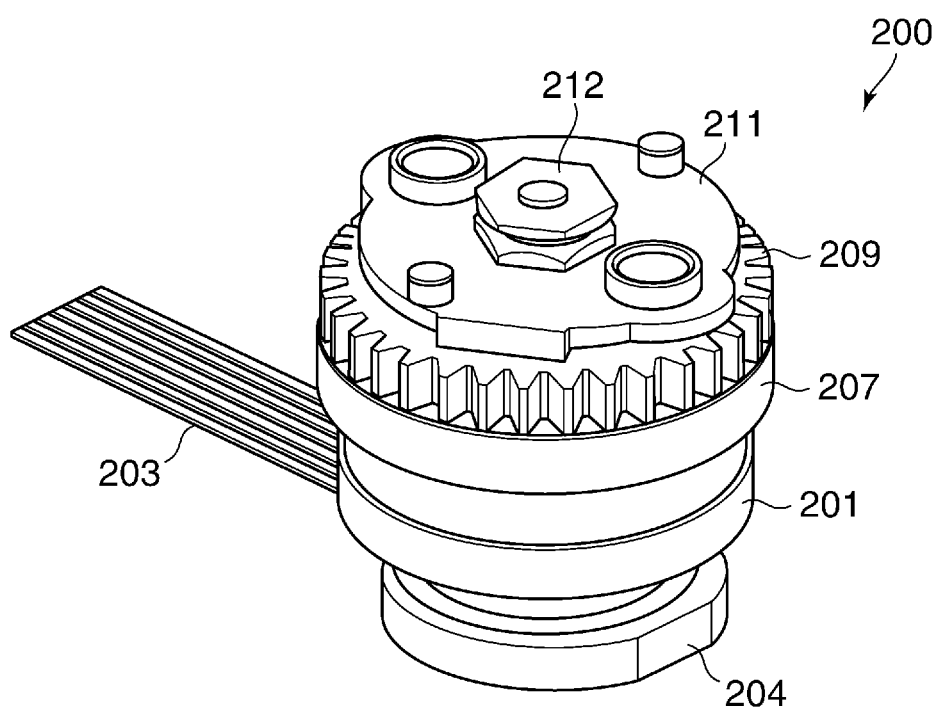
FIG. 14 is a perspective view of the vibration actuator.
Figure 15:
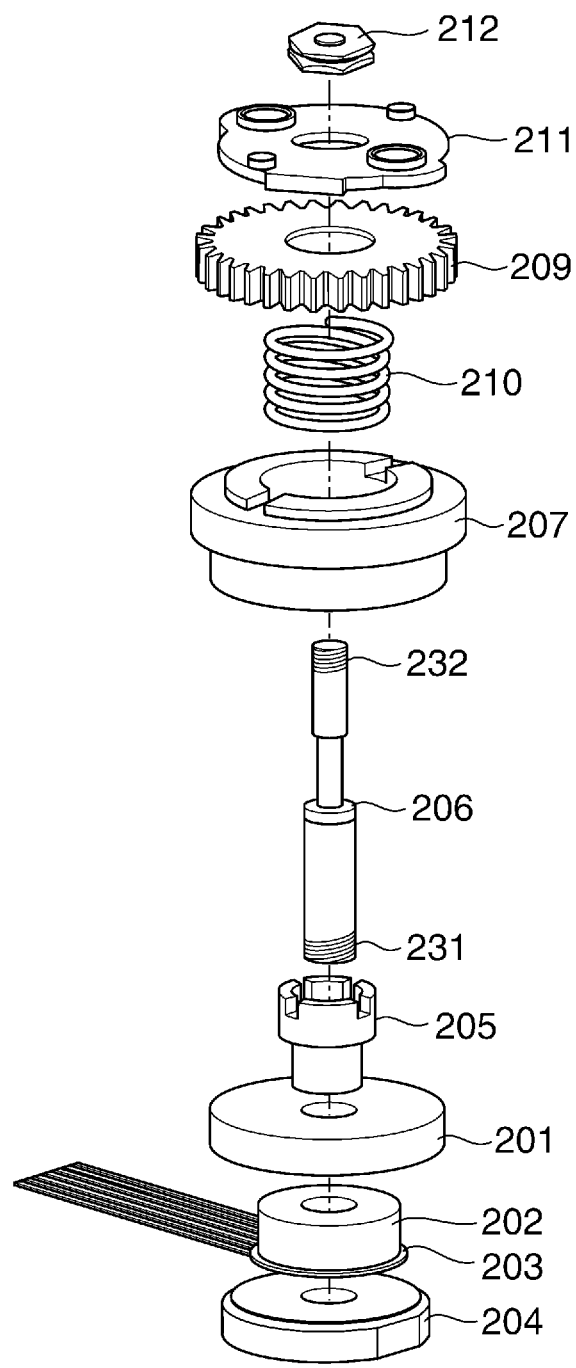
FIG. 15 is an exploded perspective view of the vibration actuator shown in FIG. 14.
Figure 16:
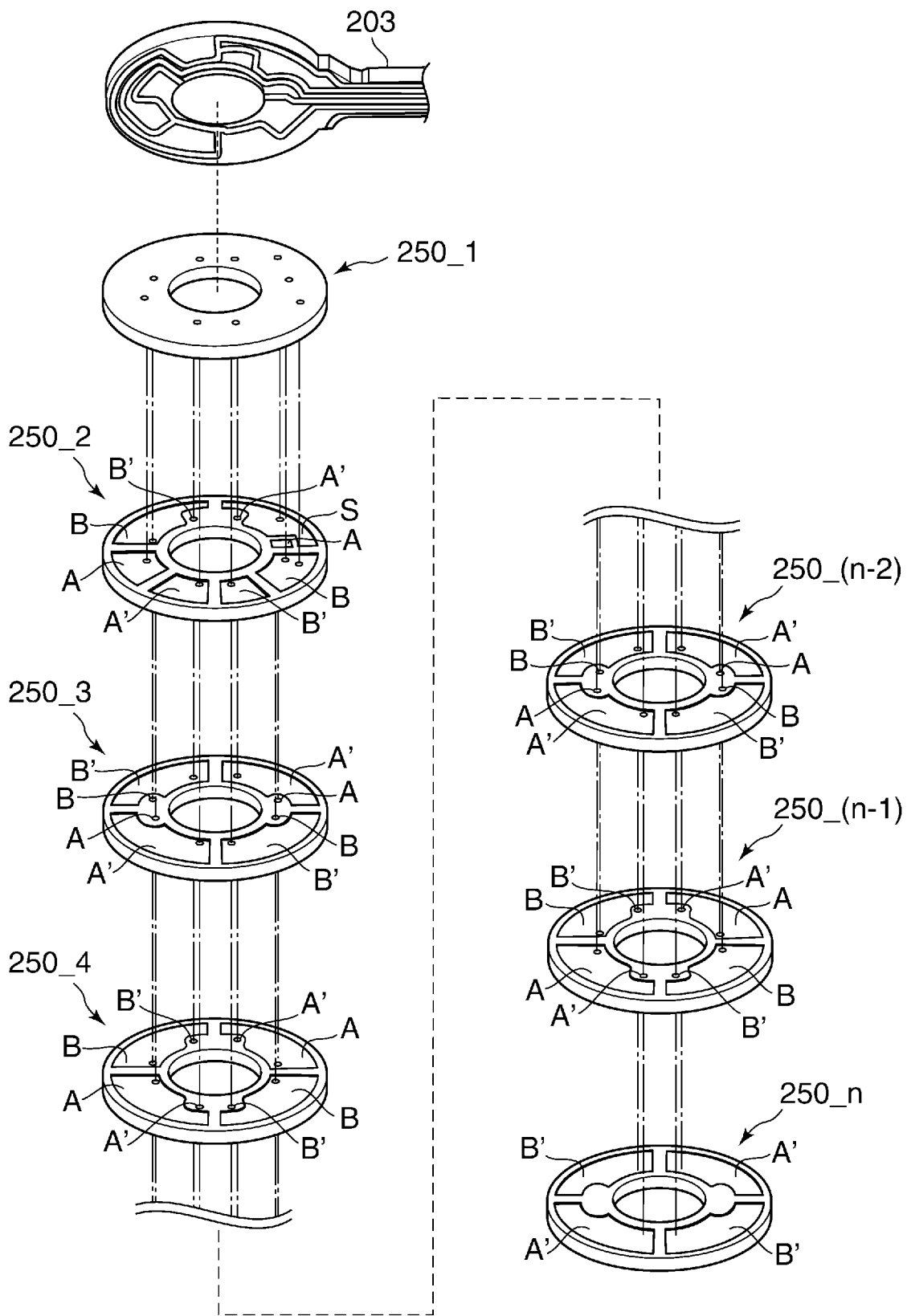
FIG. 16 is an exploded perspective view of a piezoelectric unit included in the vibration actuator shown in FIG. 14.
Figure 17A:
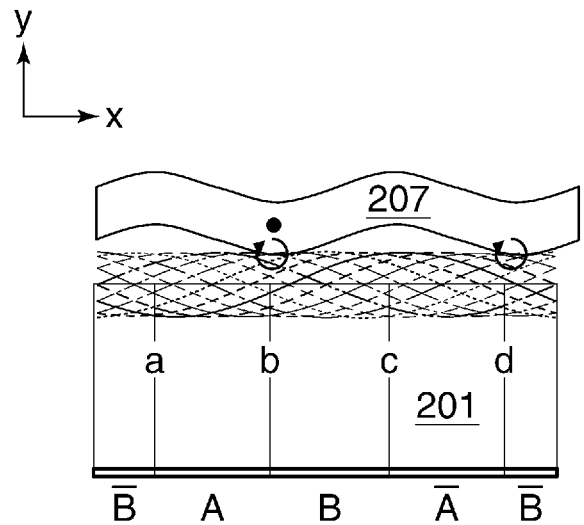
FIGS. 17A to 17D are schematic diagrams useful in explaining vibrations excited in the first elastic body when the driven body of the vibration actuator shown in FIG. 14 is driven at a high speed.
Figure 17B:
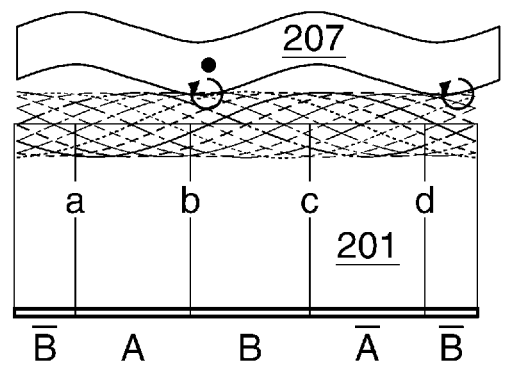
Figure 17C:
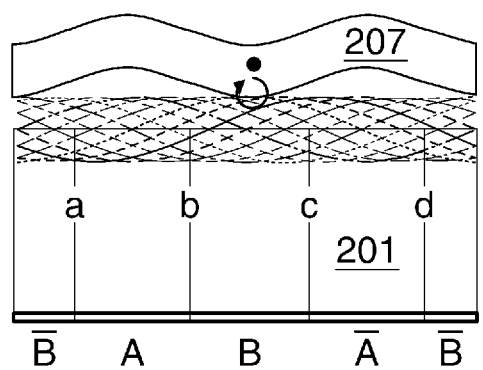
Figure 17D:
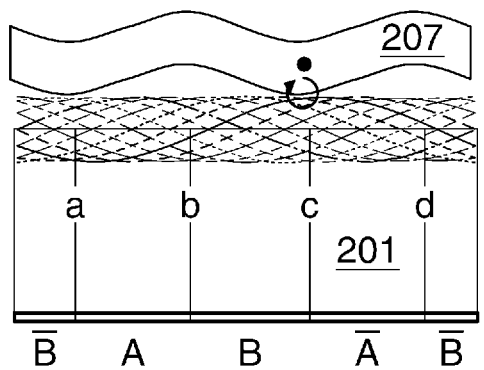

FIG. 1 is a schematic block diagram of the hardware configuration of a drive device according to a first embodiment of the present invention, for driving a vibration actuator (hereinafter referred to as the "drive device"). The drive device according to the first embodiment is applied to the vibration actuator 200 described hereinbefore with reference to FIGS. 14 to 16, and controls driving of the vibration actuator 200. Note that the construction of the vibration actuator 200 has been described, and hence description thereof is omitted here.

The drive device is comprised of an MPU 32, a first switching circuit 33a, a second switching circuit 33b, an oscillator 34, a position detection sensor 35, a power supply 36, a first differential amplifier 37, a second differential amplifier 38, and a phase difference detection circuit 39.

Figure 9:
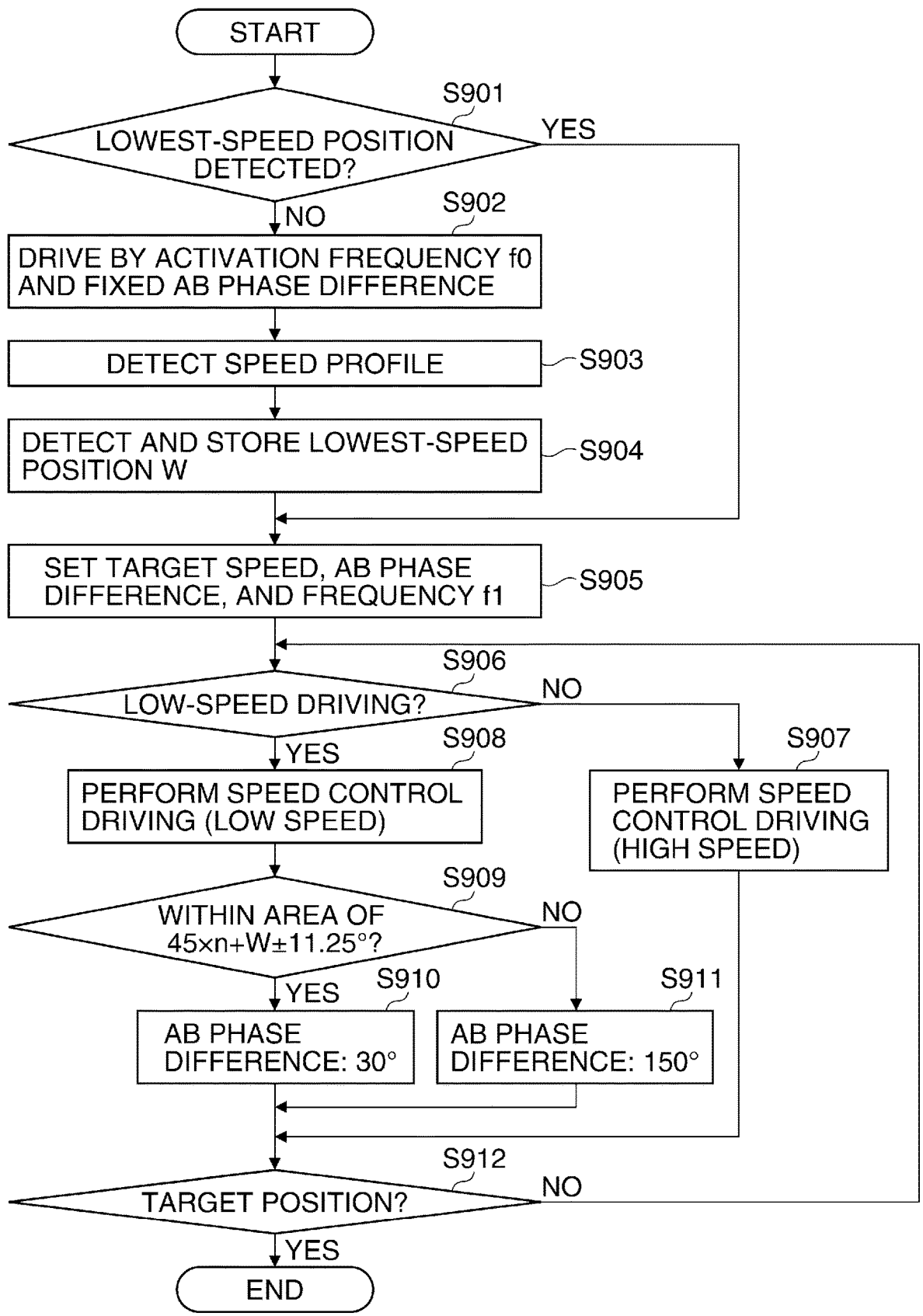
FIG. 9 is a flowchart of a drive control process performed by a drive device according to a second embodiment of the present invention, for controlling driving of the vibration actuator described with reference to FIGS. 6A and 6B.
Figure 12:
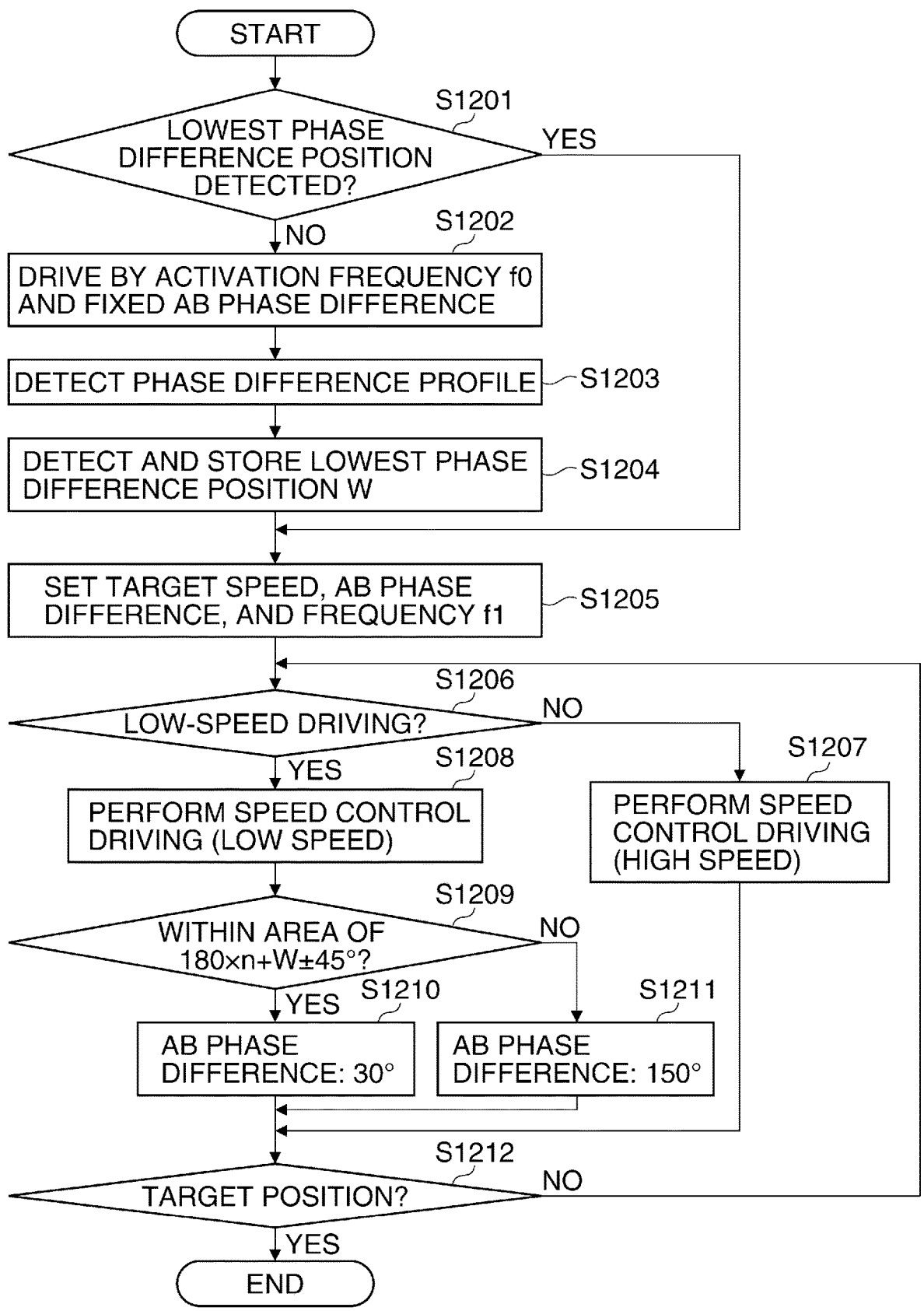
FIG. 12 is a flowchart of a drive control process performed by a drive device according to a third embodiment of the present invention, for controlling driving of the vibration actuator shown in FIG. 14.

The MPU 32 is a microcomputer, and includes a ROM storing programs, a RAM which has a program-loading area and is also used for storing parameters and calculation results, and a CPU for executing the programs. The MPU 32 controls operations of various circuits as components of the drive device by executing the programs, to thereby realize overall drive control of the vibration actuator 200. For example, drive control processes described hereinafter with reference to FIGS. 5, 9 and 12 are realized by these functions of the MPU 32.

The oscillator 34 generates drive signals of a first vibration mode and a second vibration mode based on command values from the MPU 32. Note that the first vibration mode is a vibration mode that is excited by voltages applied to the electrodes A and A' of the piezoelectric elements 250_1 to 250_n of the piezoelectric unit 202 included in the vibration actuator 200 (see FIG. 16). Further, the second vibration mode is a vibration mode that is excited by voltages applied to the electrodes B and B' of the piezoelectric elements 250_1 to 250_n(see FIG. 16). More specifically, the oscillator 34 is configured to generate the drive signals to be applied to the electrodes A, A', B, and B' of the piezoelectric elements 250_1 to 250_n, and be capable of changing the phase differences between the drive signals generated and applied to the electrodes A, A', B, and B' in a range of 0° to 360°.

The first switching circuit 33a is a circuit for switching the drive signal of the first vibration mode by a voltage of the power source. Note that the first switching circuit 33a is configured to be capable of giving a larger driving force, through combination with an inductance 41. The second switching circuit 33b is a circuit for switching the drive signal of the second vibration mode by the voltage of the power source. Note that the second switching circuit 33b is configured to be capable of giving a larger driving force, through combination with an inductance 42.

The power supply 36 is a battery, an AC adapter, or the like, for supplying the voltage to the first switching circuit 33a and the second switching circuit 33b. The first differential amplifier 37 takes out a differential signal between the drive signal applied to the electrodes A and the drive signal applied to the electrodes A' of the piezoelectric elements 250_1 to 250_n(see FIG. 16, as required). The second differential amplifier 38 takes out a differential signal between a signal (voltage) taken out from the vibration detection electrode S (vibration detection unit) and the drive signal applied to the electrodes A' (see FIG. 16, as required). Note that the second differential amplifier 38 may be configured such that it takes out a differential signal between the drive signal applied to any of the electrodes A, A', B, and B', and the signal taken out from the vibration detection electrode S (vibration detection unit).

The phase difference detection circuit 39 detects a phase difference between the differential signals obtained by the first differential amplifier 37 and the second differential amplifier 38. The MPU 32 detects a resonant state of the vibration actuator 200 based on the phase difference between the differential signals detected by the phase difference detection circuit 39, and controls the vibration actuator 200 such that the vibration actuator 200 is driven in a frequency area where the detected phase difference becomes equal to or smaller than a predetermined phase difference.

The position detection sensor 35 acquires information on a relative position of the driven body 207 with respect to the first elastic body 201. The position detection sensor 35 is formed e.g. by a photo interrupter and a slit plate. More specifically, the position detection sensor 35 detects a rotational position of the driven body 207 which is a rotation section of the vibration actuator 200. In the present embodiment, as described hereinafter, a predetermined number of pulses is set for a predetermined amount of movement of the driven body 207 with respect to the first elastic body 201, and the relative position of the driven body 207 with respect to the first elastic body 201 is acquired as a value of the number of pulses. The MPU 32 calculates the rotational position and rotational speed of the driven body 207 based on a detection signal from the position detection sensor 35, and supplies a command value for controlling the rotational speed of the driven body 207 to the oscillator 34.

Figure 2:
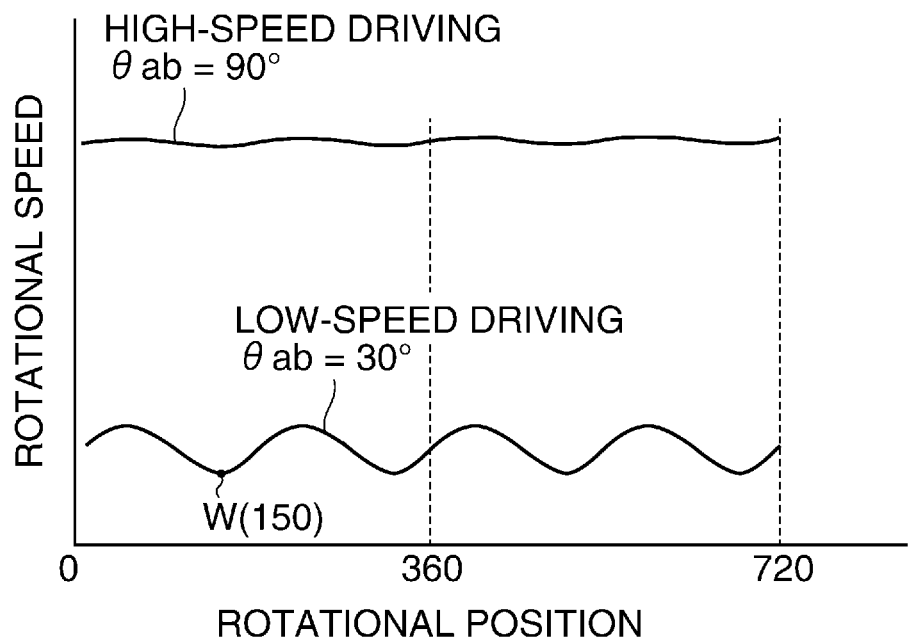
FIG. 2 is a diagram showing a relationship between a rotational position and a rotational speed of a driven body in a case where the vibration actuator shown in FIG. 14 is driven with AB phase differences of 30° and 90°, respectively.
Figure 3:
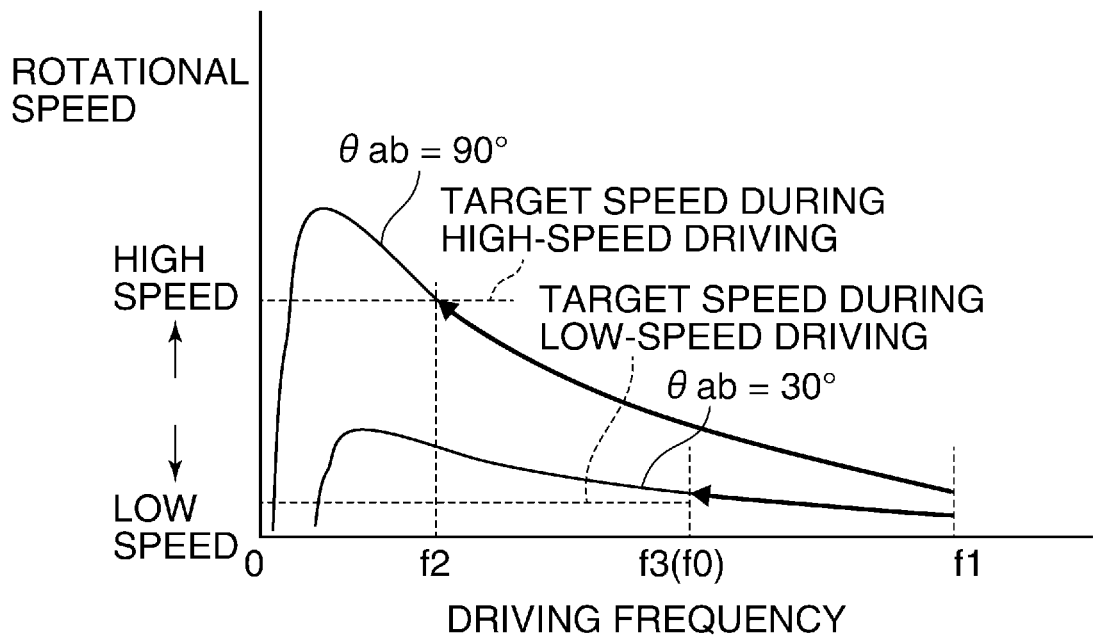
FIG. 3 is a diagram showing a relationship between a driving frequency of the vibration actuator shown in FIG. 14 and the rotational speed of the driven body.

Next, the drive control of the vibration actuator 200, which is performed by the drive device according to the first embodiment, will be described with reference to FIGS. 2 to 5. FIG. 2 is a diagram showing relationships between the rotational position and rotational speed of the driven body 207, in respective cases where the phase difference between the drive signal of the first vibration mode and the drive signal of the second vibration mode, which are supplied to the vibration actuator 200 (hereinafter referred to as the "AB phase difference", and denoted as "Gab" in FIGS. 2 to 4), is set to 90° and 30°. FIG. 3 is a diagram showing relationships between driving frequencies (frequencies of the drive signals of the first vibration mode and the second vibration mode) of the vibration actuator 200, and the rotational speed of the driven body 207.

FIGS. 4A to 4D are diagrams showing contact states between the first elastic body 201 and the driven body 207 (the contact spring portion thereof) of the vibration actuator 200, and driven states of the vibration actuator 200. Note that in FIGS. 4A to 4D, "A" indicates the phase A, a letter of "A" with "- (bar)" thereover indicates the phase A', "B" indicates the phase B, and a letter of "B" with "- (bar)" thereover indicates the phase B'. The definitions of the phases A, A', B, and B' should be interpreted according to the description given with reference to FIGS. 17A to 17D.

FIG. 5 is a flowchart of a drive control process performed by the drive device shown in FIG. 1, for controlling driving of the vibration actuator 200. The drive control process shown in FIG. 5 is realized by the CPU of the MPU 32, which loads a program stored in the ROM of the MPU 32 into the RAM of the MPU 32, and controls the operations of the various circuits as components of the drive device. Here, the description of the drive control process shown in FIG. 5 is given by referring to FIGS. 2 to 4A to 4D, as required.

In a step S501, when the vibration actuator 200 is activated, the MPU 32 determines whether or not a lowest-speed position, referred to hereinafter, has been detected. If the lowest-speed position has been detected (YES to the step S501), the MPU 32 proceeds to a step S505, whereas if the lowest-speed position has not been detected (NO to the step S501), the MPU 32 proceeds to a step S502.

In the step S502 to a step S504, detection of the lowest-speed position is performed. In the step S502, the MPU 32 fixes the AB phase difference to 30°, and operates the vibration actuator 200 at a frequency f0. In the step S503, the MPU 32 detects a relationship between the rotational position and rotational speed of the driven body 207 (speed profile). A curve of "θab=30°" indicated in FIG. 2 indicates a relationship between the rotational position and rotational speed of the driven body 207 in a case where the vibration actuator 200 is driven with the AB phase difference set to 30°. Here, the position detection sensor 35 detects the rotational position of the driven body 207 assuming that 360 pulses of the drive signal correspond to one rotation (360 pulses/one rotation). Therefore, in a case where one of rotational directions is defined as a normal direction and the driven body 207 is driven in the normal direction, the rotational position indicated by the number of pulses is increased up to 360 by one rotation, and up to 720 by two rotations. It is understood from FIG. 2 that the rotational speed of the driven body 207 becomes lowest at two positions per one rotation, and the lowest-speed positions appear at rotational positions of 150 and 330. From this, in the step S504, the MPU 32 determines the rotational position 150, which is smaller in value, as the lowest-speed position W, and stores the value of the rotational position 150 in the RAM provided therein.

In the step S505 et seq., normal driving (position designation movement) of the vibration actuator 200 is performed. In the step S505, the MPU 32 sets a target rotational speed at which the driven body 207 is to be rotated, an activation frequency f1, and the AB phase difference. When low-speed driving of the driven body 207 is not performed, the AB phase difference is set to 90° (or −90°). Then, the MPU 32 controls the frequency such that the frequency of the drive signals is swept from the activation frequency f1 to a lower frequency, as indicated by a curve of θab=90° in FIG. 3, to thereby control the rotational speed. Here, it is assumed that the target rotational speed (hereinafter referred to as "the target speed") for high-speed driving is reached when the rotational speed becomes equal to a frequency f2, and the MPU 32 controls the frequency of the drive signals such that the target speed is maintained in the vicinity of the frequency f2. Note that although in the illustrated example, the driven body 207 is driven for rotation in the normal direction and hence the AB phase difference is set to +90°, in a case where the driven body 207 is driven for rotation in a negative direction opposite to the normal direction, the AB phase difference is set to −90°.

In a step S506, the MPU 32 determines whether or not it is required to switch the high-speed driving to the low-speed driving. If it is required to switch the high-speed driving to the low-speed driving (YES to the step S506), the MPU 32 proceeds to a step S508, whereas if it is not required to switch the high-speed driving to the low-speed driving (NO to the step S506), the MPU 32 proceeds to a step S507. In the step S507, the MPU 32 continues the speed control for the high-speed driving, and then proceeds to a step S512.

In the step S508, the MPU 32 controls the frequency, with the AB phase difference during the low-speed driving held at 30°, such that the frequency of the drive signals is swept from the activation frequency f1 to a lower frequency, as indicated by a curve of θab=30° in FIG. 3, so as to make the rotational speed equal to the target speed, to thereby control the rotational speed. Here, it is assumed that the target speed for low-speed driving is reached when the rotational speed becomes equal to a frequency f3, and the MPU 32 controls the frequency of the drive signals such that the target speed is maintained in the vicinity of the frequency f3.

In a step S509, the MPU 32 determines whether or not the current position of the driven body 207 is within areas of rotational positions "180×n+W±45" defined by the lowest-speed position W detected in the step S504. Here, since it has been detected in the step S504 that "W=150", it is determined whether or not the current position of the driven body 207 is within areas of rotational positions 105 to 195, 285 to 375, and so forth. If the current position of the driven body 207 is within the areas of the rotational positions "180×n+W±45" (YES to the step S509), the MPU 32 proceeds to a step S510, whereas if the current position of the driven body 207 is not within the areas of the rotational positions "180×n+W±45" (NO to the step S509), the MPU 32 proceeds to a step S511.

In the step S510, the MPU 32 holds the AB phase difference of the drive signals at 30°, and continues the low-speed driving. On the other hand, in the step S511, the MPU 32 changes (switches) the AB phase difference of the drive signals to 150°, and continues the low-speed driving. Note that as a method of switching the two drive signals (the first drive signal and the second drive signal) to change the AB phase difference, there has been proposed a method which switches the first drive signal and the second drive signal to a third drive signal and a fourth drive signal, respectively. Further, there has been proposed a method which fixes one of the first and second drive signals, and switches the other drive signal. In other words, it is possible to use a method of changing both the phases of the drive signal of the first vibration mode and the drive signal of the second vibration mode, and a method of fixing the phase of one of the drive signals and changing the phase of the other drive signal.

In the step S512 following the step S510 or S511, the MPU 32 determines whether or not the driven body 207 has reached a target position. If the driven body 207 has reached the target position (YES to the step S512), the MPU 32 terminates the drive control of the vibration actuator 200, whereas if the driven body 207 has not reached the target position (NO to the step S512), the MPU 32 returns to the step S506.

Figure 4A:
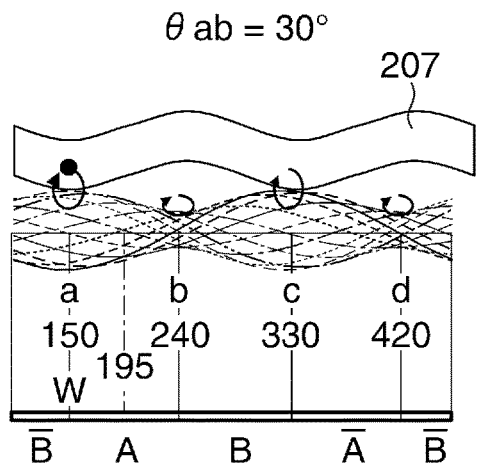
FIGS. 4A to 4D are diagrams showing contact states between a first elastic body and the driven body of the vibration actuator shown in FIG. 14, and driven states of the vibration actuator.
Figure 4B:
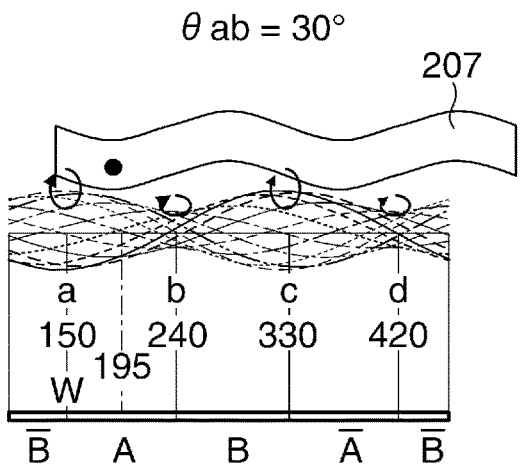

The control performed in the steps S508 to S511 will be specifically described with reference to FIGS. 4A to 4D. FIGS. 4A and 4B show states in which the convex portions of the driven body 207 are in the areas of 105 to 195 and 285 to 375, with the AB phase difference set to 30°. Note that the convex portions of the driven body 207 are formed at substantially equally-spaced intervals in the circumferential direction.

In FIGS. 4A and 4B, the y-direction component, which is a component in the displacement direction of the vibration amplitude generated in the first elastic body 201, becomes the largest at the position a and the position c. In short, the peak of the vibration amplitude appears at the position a and the position c. In this state, the convex portions of the driven body 207 and positions in the first elastic body 201 at which the amount of displacement of the vibration amplitude is large generally coincide with each other, and the driven body 207 and the first elastic body 201 are brought into contact with each other at the positions a and c with the largest pressure. At the positions a and c, the x-direction component, which is a component of the vibration amplitude in the feeding direction, is small, but the y-direction component is large, so that the contact load is small, whereby it is possible to move the driven body 207 at a low speed in a desired rotational direction.

Figure 4C:
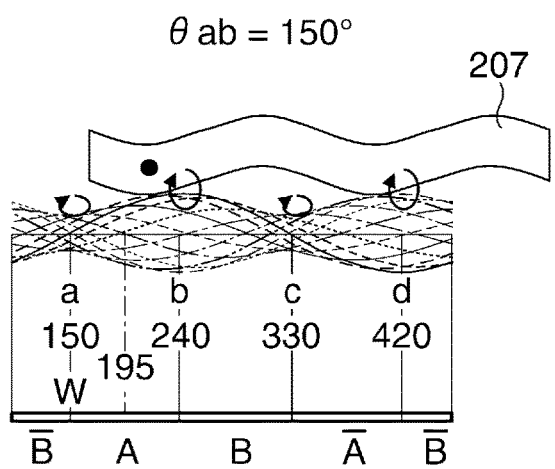
Figure 4D:
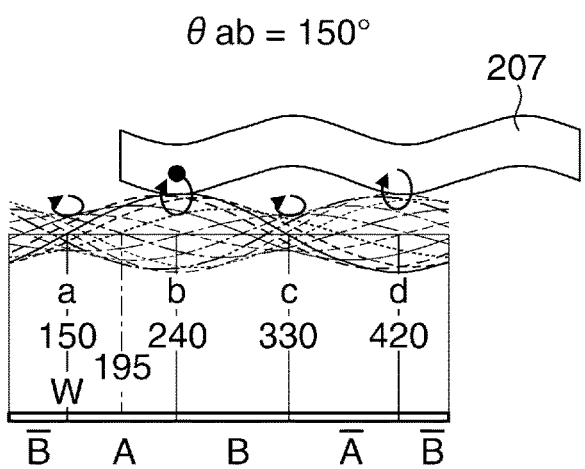

On the other hand, when the driven body 207 is further moved from the FIG. 4B state, and the convex portion of the driven body 207 exceeds a rotational position 195, the AB phase difference is switched from 30° to 150°. With this, as shown in FIGS. 4C and 4D, positions in the first elastic body 201 at which the y-direction component of the vibration amplitude becomes large are changed from the positions a and c to the positions b and d. As a consequence, when the driven body 207 is further moved, the convex portions of the driven body 207 and the positions of the first elastic body 201 at which the y-direction component of the vibration amplitude becomes large generally coincide with each other, and the driven body 207 and the first elastic body 201 are brought into contact with each other at the positions b and d with the largest pressure. At the positions b and d, the x-direction component of the vibration amplitude is small, but the y-direction component is large, and hence the contact load is small, and it is possible to rotate the driven body 207 at a low speed in a desired rotational direction. When the driven body 207 is further moved from the position shown in FIG. 4D, and the convex portion of the driven body 207 exceeds the rotational position 285, the AB phase difference is returned to 30°. This makes it possible to shift the driven body 207 to the state shown in FIG. 4A.

As described hereinabove, in the present embodiment, the AB phase difference is switched between 30° and 150° according to changes in the rotational position of the driven body 207, whereby it is possible to maintain a state in which portions of the first elastic body 201 at which the y-direction component of the vibration amplitude becomes large and the convex portions of the driven body 207 are in contact with each other. This makes it possible to stably hold a low-speed driven state of the vibration actuator 200 until the driven body 207 is caused to reach the target position to thereby terminate driving of the vibration actuator 200, and thereby makes it possible to expand the dynamic range of driving speed from low-speed driving to high-speed driving of the vibration actuator 200.

Note that although FIGS. 4A to 4D show changes in the position of the driven body 207, occurring during approximately one rotation of the driven body, also in causing continuous rotation of the driven body 207, it is only required to similarly set areas in which drive control of the vibration actuator 200 is performed with the AB phase difference set to 30°, and areas in which the drive control is performed with the AB phase difference set to 150°. For example, the areas in which the AB phase difference is set to 30° can be set to rotational position ranges of 105 to 195, 285 to 375, 465 to 555, 645 to 735, . . . from "180×n+W−45 to 180×n+W+45 (n: an integer)". Similarly, the areas in which the AB phase difference is set to 150° can be set to rotational position ranges of 15 to 105, 195 to 285, 375 to 465, 555 to 645, . . . from "180×n+(W+90)−45 to 180×n+(W+90)+45 (n: an integer)".

Further, although the above description is given of the case where the driven body 207 is driven for rotation in one direction set in advance (the normal direction), in a case where the driven body 207 is rotated in a direction opposite to the above direction, it is only required that the AB phase difference is switched between −30° and 210°. Further, although in the above description, the AB phase difference during the low-speed driving is set to 30°, this is not limitative, but the AB phase difference during the low-speed driving may be set to 20°, 10°, 40° or the like according to a required speed. Further, although in the above description, the AB phase difference is switched using, as a reference position, a position where the speed change becomes small when the vibration actuator 200 is driven without changing the frequency of the drive signals for driving the vibration actuator 200, the AB phase difference may be switched using a position where the speed change is large, as the reference position.

Incidentally, in the step S504, the lowest-speed position W is determined as a position where the positions in the first elastic body 201 at which the amount of displacement of the vibration amplitude becomes the largest and the convex portions of the driven body 207 coincide with each other. However, even if the lowest-speed position W does not necessarily coincide with the convex portion of the driven body 207, it is possible to obtain an effect of reducing speed fluctuation.

Further, the number of times of operation for switching the circumferential positions in the first elastic body 201 at which the vibration amplitude becomes large is represented by t×m×u, assuming that the number of convex portions of the driven body 207 is represented by t, the number of waves of vibration formed per circumference of the first elastic body 201 is represented by m, and the number of times of switching the largest amplitude positions in the first elastic body 201 is represented by u. In the case of the present embodiment, since t=2, m=1, and u=2 hold, the number of times of operation for switching the circumferential positions in the first elastic body 201 at which the vibration amplitude becomes large is four. Note that the number of waves in the circumferential direction of the first elastic body 201 is a value calculated based on electrode patterns formed on the piezoelectric elements 250_1 to 250_n forming the piezoelectric unit 202.

However, this is not limitative, but instead of limiting the number of times of switching the largest amplitude positions in the first elastic body 201 to two, which is the number of stages between which the AB phase difference is changed, but by changing an AB voltage ratio or the like, it is possible to increase the number of times of switching the largest amplitude positions in the first elastic body 201, whereby it is possible to realize smoother low-speed driving.

Figure 6A:
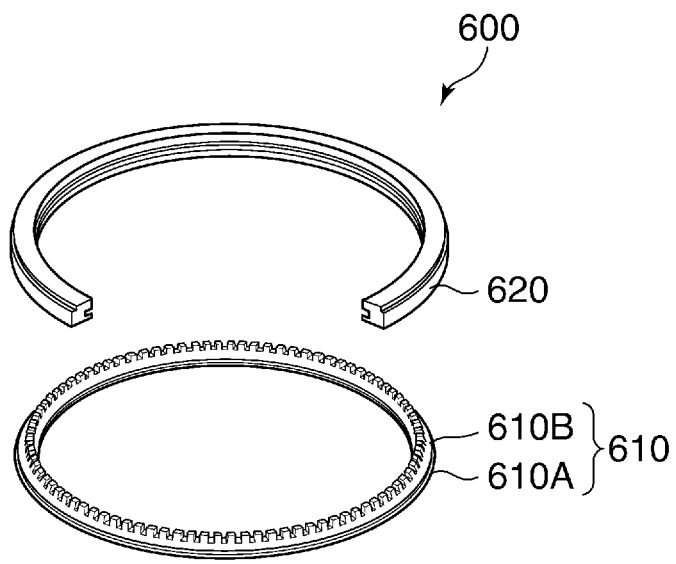
FIGS. 6A and 6B are a perspective view of a vibrating body and a driven body forming a vibration actuator different from the vibration actuator shown in FIG. 14, and a plan view of an electrode pattern of a piezoelectric element forming the vibrating body.
Figure 6B:
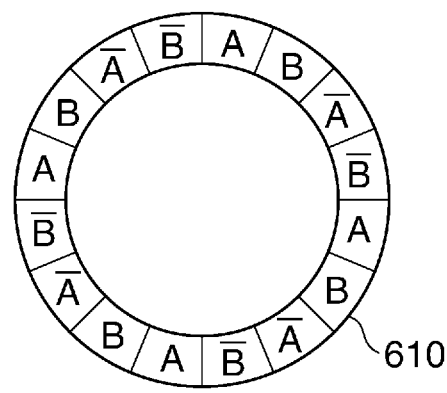

Next, a second embodiment of the present invention will be described. FIG. 6A is a perspective view of a vibrating body 610 and a driven body 620 forming a vibration actuator 600 to which a drive device according to the second embodiment is applied, and FIG. 6B is a plan view of an electrode pattern of a piezoelectric element as an electromechanical energy conversion element as a component of the vibrating body 610. Note that the drive device performing drive control of the vibration actuator 600 has the same hardware configuration as that of the drive device shown in FIG. 1, and hence components corresponding to those of the drive device shown in FIG. 1 are denoted by the same reference numerals, and description thereof is omitted. Further, the vibration actuator 600 has the same configuration as that of the vibration actuator 200 described above, except for components described hereafter, and hence description of components thereof other than the components is omitted.

Although illustration of a detailed configuration of the vibration actuator 600 is omitted, both the vibrating body 610 and the driven body 620 have an annular shape, and are arranged coaxially with each other. The driven body 620 is brought into pressure contact with the vibrating body 610 in a state supported rotatably about its rotational axis. The vibrating body 610 has a structure in which a piezoelectric element 610A having an annular shape with the FIG. 6B electrode pattern formed thereon is bonded to a lower surface (a surface opposite to a surface brought into pressure contact with the driven body 620) of an elastic member 610B having an annular shape. In short, the vibrating body 610 is comprised of the piezoelectric element 610A and the elastic member 610B. The electrode pattern of the piezoelectric element 610A is formed such that the number of waves of progressive vibration generated in the vibrating body 610 becomes four during one rotation of the driven body.

In FIG. 6B, "A" represents a phase A, a letter of "A" with "- (bar)" thereover represents a phase A', "B" represents a phase B, and a letter of "B" with "- (bar)" thereover represents a phase B'. The same is applied to FIGS. 8A and 8B, referred to hereinafter. Further, the definitions of the phases A, A', B, and B' should be interpreted according to the description given with reference to FIGS. 17A to 17D. Note that in the vibration actuator 200 described in the first embodiment, the number of waves of progressive vibration generated in the first elastic body 201 is one during one rotation of the driven body.

The vibrating body 610 is fixed. Therefore, a drive signal is applied to the piezoelectric element 610A of the vibrating body 610 using the drive device shown in FIG. 1, whereby the driven body 620 is rotated to relatively change the position of the driven body 620 with respect to the vibrating body 610.

Next, the drive control of the vibration actuator 600, which is performed by the drive device according to the second embodiment, will be described with reference to FIGS. 7 to 9.

Figure 7:
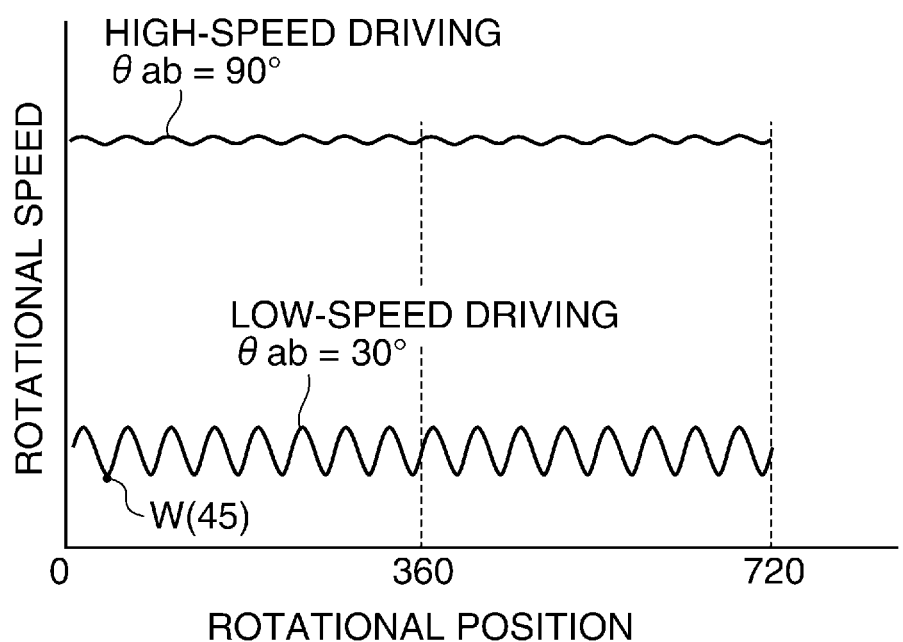
FIG. 7 is a diagram showing relationships between the rotational position and rotational speed of the driven body in first and second vibration modes in which the vibration actuator described with reference to FIGS. 6A and 6B is driven by respective drive signals with different phase differences.
Figure 8A:
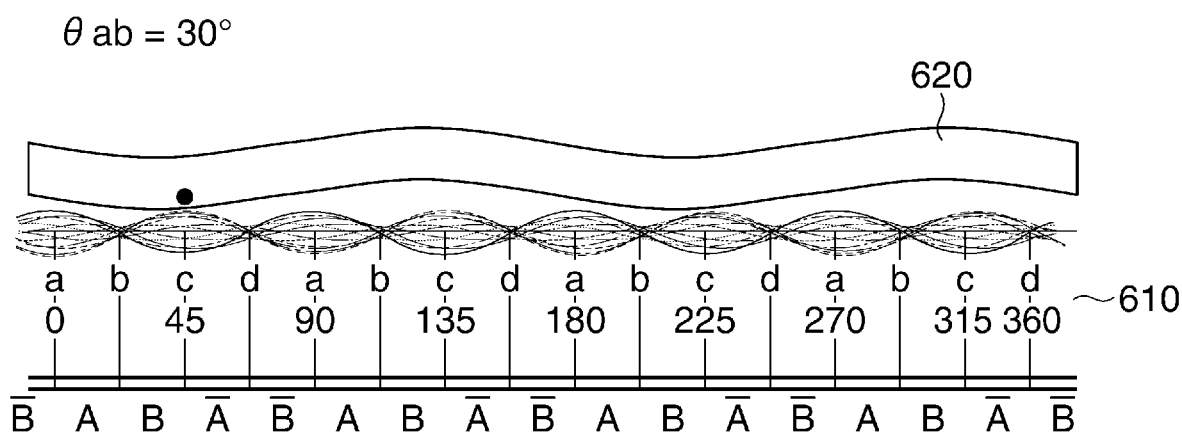
FIGS. 8A and 8B are diagrams showing contact states between the vibrating body and the driven body of the vibration actuator described with reference to FIGS. 6A and 6B, and driven states of the vibration actuator.
Figure 8B:
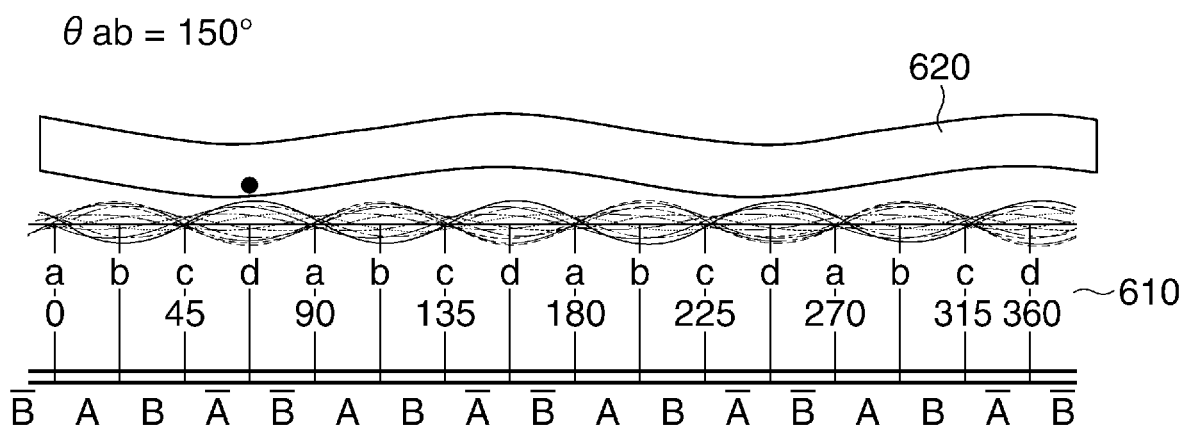

FIG. 7 is a diagram showing relationships between the rotational position and rotational speed of the driven body 620 in respective cases where the AB phase difference is set to 90° and 30°. FIGS. 8A and 8B are diagrams showing contact states between the vibrating body 610 and the driven body 620 of the vibration actuator 600, and driven states of the vibration actuator 600. FIG. 9 is a flowchart of a drive control process performed by the drive device according to the second embodiment, for controlling driving of the vibration actuator 600. Here, the description of the drive control process shown in FIG. 9 is given by referring to FIG. 7 and FIGS. 8A to 8B, as required.

Steps S901 and S902 are the same as the steps S501 and S502 in FIG. 5, and hence description thereof is omitted.

In a step S903, the MPU 32 detects a relationship between the rotational position and the rotational speed (speed profile). A curve of "θab=30°" in FIG. 7 indicates a relationship between the rotational position and rotational speed of the driven body 620 in a case where the vibration actuator 600 is driven with the AB phase difference set to 30°. Here, the position detection sensor 35 detects the rotational position of the driven body 620 assuming that 360 pulses of the drive signal correspond to one rotation (360 pulses/one rotation). Therefore, in a case where one of rotational directions is defined as a normal direction, and the driven body 620 is driven in the normal direction, the rotational position is increased up to 360 by one rotation, and up to 720 by two rotations.

It is understood from FIG. 7 that uneven speed in a cycle of 45 pulses occurs in the speed profile obtained by the drive control set in the step S902. Further, as shown in FIG. 8A, it is understood that when the vibration actuator 600 is driven with the AB phase difference set to 30°, uneven vibration amplitude occurs at a rate of eight positions per one rotation. That is, from the rotational positions and rotational speeds of the driven body 620, obtained by driving the driven body 620 through several rotations, it is understood that the rotational speed of the driven body 620 becomes lowest at eight positions per one rotation. More specifically, rotational positions 0, 45, 90, 90, 135, 180, . . . indicated in FIGS. 7, 8A, and 8B, i.e. rotational positions 45×n (n: an integer) become lowest-speed positions. Therefore, in a step S904, the MPU 32 determines the rotational position 45, which is smallest in value, as the lowest-speed position W, and stores the value of the rotational position 45 in the RAM provided therein. However, any of the lowest-speed positions other that the rotational position 45 may be determined as the lowest-speed position W.

In the speed control of the driven body 620, processing in steps S905 to S908 is the same as the processing in the steps S505 to S508 in FIG. 5, and hence description thereof is omitted.

Although the uneven vibration amplitude in the vibrating body 610 occurs at the ratio of eight positions per one rotation, the convex and concave portions of the driven body 620 are formed due to a machining error. In the present embodiment, similar to the driven body 207 described in the first embodiment, the driven body 620 has two convex portions protruding toward the vibrating body 610 per circumference thereof. Therefore, in the low-speed speed control in the step S908, as shown in FIG. 8A, the convex portions of the driven body 620 are brought into contact with the rotational positions 45 and 225 with the largest pressure. When the driven body 620 is moved from this state by 22.5 in terms of rotational position, the convex portions of the driven body 620 are brought to positions at which the vibration amplitude of the vibrating body 610 is small and the lowest speed cannot be generated, as described in the first embodiment.

To solve this problem, similar to the first embodiment, the second embodiment as well is configured such that the vibrating body 610 and the driven body 620 are brought into contact with each other at positions where the amount of displacement of the vibration amplitude becomes large. To this end, in a step S909, the MPU 32 determines whether or not the current position of the driven body 620 is within areas of rotational positions "45×n+W±11.25" defined by the lowest-speed position W detected in the step S904. Here, since "W=45", the areas correspond to rotational position ranges of 33.75 to 56.25, 78.75 to 101.25, . . . . If the current position of the driven body 620 is within the areas of the rotational position ranges of "45×n+W±11.25" (YES to the step S909), the MPU 32 proceeds to a step S910, whereas if the current position of the driven body 620 is not within the areas of the rotational position ranges of "45×n+W±11.25" (NO to the step S909), the MPU 32 proceeds to a step S911. Note that the step S910 to a step S912 are the same as the steps S510 to S512 in FIG. 5, and hence description thereof is omitted.

FIG. 8B shows a state after the MPU 32 has proceeded from the step S909 to the step S911 along with the movement of the driven body 620 and has switched the AB phase difference from 30° to 150°. When the AB phase difference is 150°, positions where the amount of displacement of the vibration amplitude of the vibrating body 610 becomes the largest are positions where the amount of displacement of the vibration amplitude of the vibrating body 610 was the smallest when the AB phase difference was 30°. In the steps S909 to S911, alternate switching of the AB phase difference from 30° to 150° and from 150° to 30° is repeatedly performed according to the rotational positions of the driven body 620 (positions of the convex portions). In the present embodiment, operations for switching the circumferential positions in the vibrating body 610 at which the vibration amplitude becomes large are performed 2×4×2=16 times assuming that the number of convex portions of driven body 620 is 2, the number of circumferential waves of the vibrating body 610 is 4, and the number of times of switching the largest amplitude positions in the vibrating body 610 is 2.

Thus, by driving the driven body 620 by always bringing the convex portions thereof into contact with positions in the vibrating body 610 at which the vibration amplitude is large, it is possible to stably rotate the driven body 620 even during the low-speed driving thereof.

Note that although FIGS. 8A and 8B show changes in the position of the driven body 620, occurring during approximately one rotation thereof, also in causing continuous rotation of the driven body 620, it is only required to similarly set areas in which drive control of the vibration actuator 600 is performed with the AB phase difference set to 30°, and areas in which the drive control is performed with the AB phase difference set to 150°. Further, although the above description is given of the case where the driven body 620 is driven for rotation in one direction determined in advance (the normal direction), in a case where the driven body 620 is rotated in a direction opposite to the above direction, it is only required to switch the AB phase difference between −30° and 210°. Further, although in the above description, the AB phase difference during the low-speed driving is set to 30°, this is not limitative, but the AB phase difference during the low-speed driving may be set to 20°, 10°, 40° or the like, according to a required speed.

Next, a third embodiment of the present invention will be described. Similar to the second embodiment, a drive device according to the third embodiment has the same hardware configuration as that of the drive device shown in FIG. 1, and hence components corresponding to those of the drive device shown in FIG. 1 are denoted by the same reference numerals, and description thereof is omitted. The drive device according to the third embodiment is applied to the vibration actuator 200 described with reference to FIGS. 14 to 16, and the control of driving the vibration actuator 200 is performed by a method different from the methods according to the first and second embodiments. Here, positions in the first elastic body 201 at which the vibration amplitude becomes large and convex portions of the driven body 207 coincide with each other are calculated from a phase difference detected by the phase difference detection circuit 39 (hereinafter referred to as the "AS phase difference"). As described hereinabove with reference to FIG. 1, the AS phase difference is a phase difference detected by the phase difference detection circuit 39 between the differential signal taken out by the first differential amplifier 37 and the differential signal taken out by the second differential amplifier 38.

Figure 10:
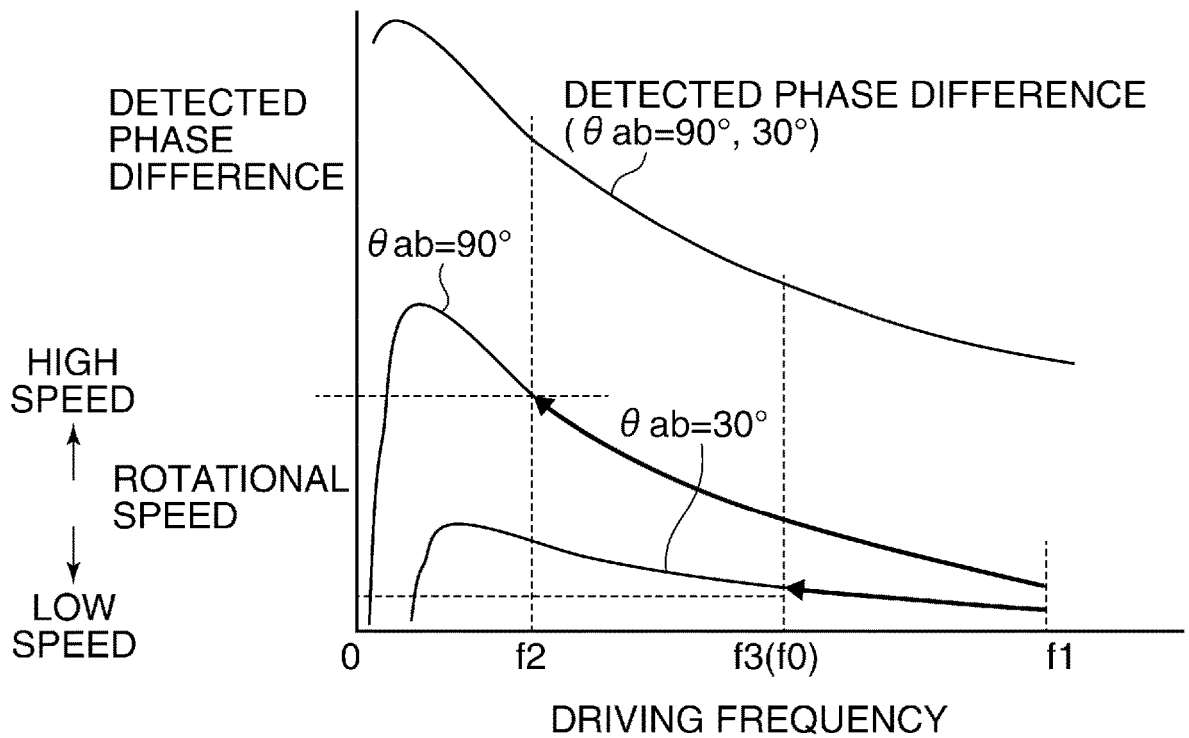
FIG. 10 is a diagram showing relationships between the rotational speed of the driven body and an AS phase difference, and the driving frequency, in the vibration actuator shown in FIG. 14.
Figure 11:
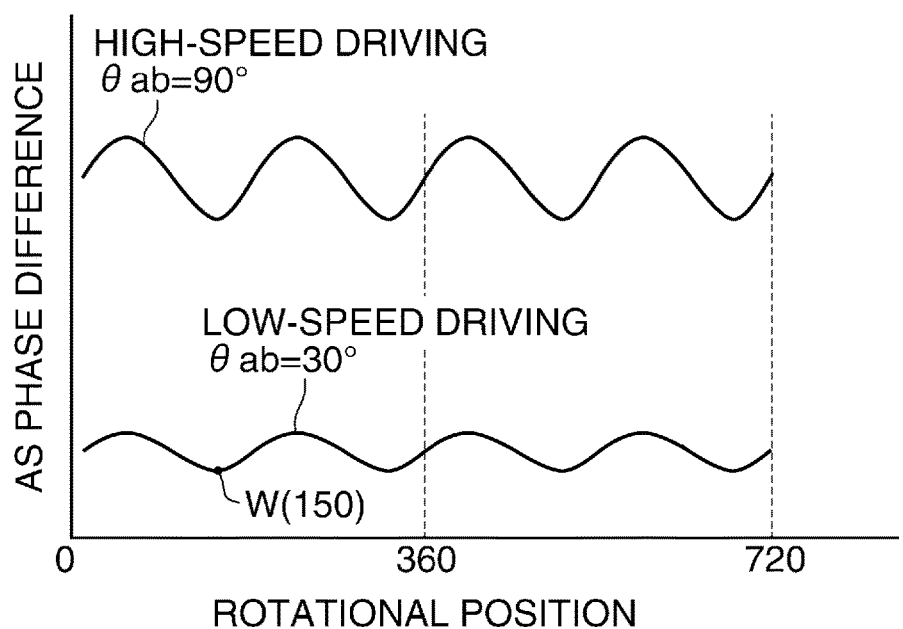
FIG. 11 is a diagram showing relationships between the rotational position of the driven body and the AS phase difference in respective cases where the vibration actuator shown in FIG. 14 is driven with AB phase differences of 30° and 90°.

FIG. 10 is a diagram showing relationships between the rotational speed of the driven body and the AS phase difference, and the driving frequency, and is formed by adding the relationship between the AS phase difference and the driving frequency to FIG. 3. FIG. 11 is a diagram showing relationships between the rotational position of the driven body 207 and the AS phase difference in respective cases where the vibration actuator 200 is driven with AB phase differences set to 30° and 90°. In FIG. 11, the driving frequency is fixed to the frequency f2 indicated in FIG. 10 in the case where the AB phase difference is 90°, and the driving frequency is fixed to the frequency f3 indicated in FIG. 10 in the case where the AB phase difference is 30°. Further, the rotational position of the driven body 207 is detected by the position detection sensor 35 assuming that 360 pulses of the drive signal correspond to one rotation (360 pulses/one rotation).

FIG. 12 is a flowchart of a drive control process performed by the drive device according to the third embodiment, for controlling driving of the vibration actuator 200. Here, the description of the drive control process shown in FIG. 12 is given by referring to FIGS. 10 and 11, as required.

In a step S1201, the MPU 32 determines whether or not a rotational position at which the AS phase difference takes the lowest value (hereinafter referred to as the "lowest phase difference position") has been detected. If the lowest phase difference position has been detected (YES to the step S1201), the MPU 32 proceeds to a step S1205, whereas if the lowest phase difference position has not been detected (NO to the step S1201), the MPU 32 proceeds to a step S1202.

In the step S1202 to a step S1204, the MPU 32 performs detection of the lowest phase difference position. In the step S1202, the MPU 32 fixes the AB phase difference to 30°, and operates the vibration actuator 200 at the frequency f0. At this time, as indicated in FIG. 10, at the frequency f0, the driven body 207 is rotated at a low speed, and is operated by a phase difference dependent on a vibrational state of the first elastic body 201 at that time. It is understood that the value of this phase difference is different depending on the driving frequency, and there is a correlation between the rotational speed and the phase difference.

Figure 18A:
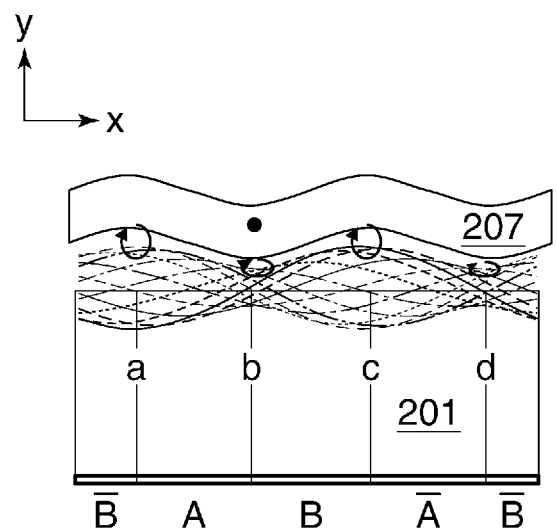
FIGS. 18A to 18D are schematic diagrams useful in explaining vibrations excited in the first elastic body when the driven body of the vibration actuator shown in FIG. 14 is driven at a low speed.
Figure 18B:
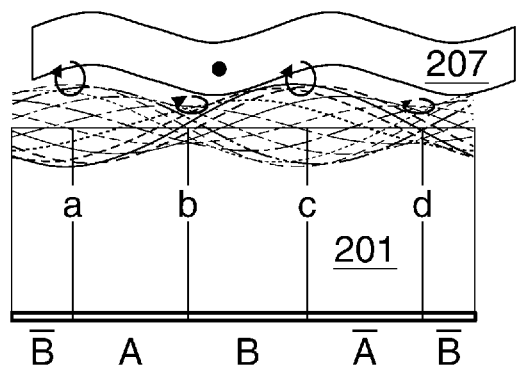
Figure 18C:
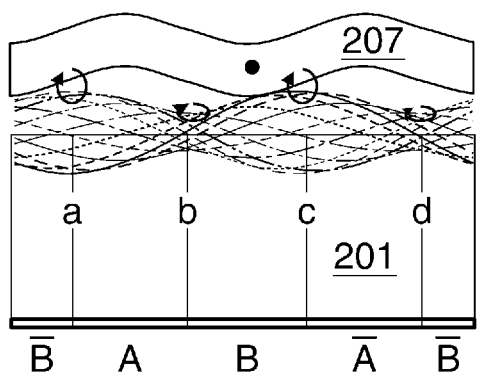
Figure 18D:
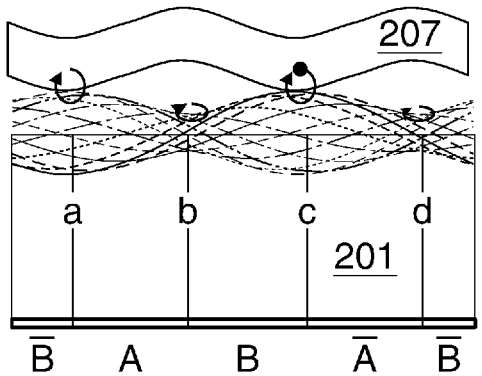

In the step S1203, the MPU 32 detects a relationship between the AS phase difference and the rotational position of the driven body 207 (phase difference profile). Here, when the vibration actuator 200 is operated with the AB phase difference being fixed to 30°, the contact state between the first elastic body 201 and the convex portions of the driven body 207 varies as described hereinabove with reference to FIGS. 18A to 18D. Therefore, as shown in FIG. 11, the detected phase difference varies with the change in the contact state between the first elastic body 201 and the convex portions of the driven body 207. For example, as shown in FIG. 18A, when the first elastic body 201 and the driven body 207 are brought into contact with each other via substantially entire surfaces thereof, the AS phase difference becomes larger. On the other hand, as shown in FIG. 18D, when a contact area where the first elastic body 201 and the driven body 207 are brought into contact with each other is small, the AS phase difference is small. When the contact area where the first elastic body 201 and the driven body 207 are brought into contact with each other is small, the rotational speed of the driven body 207 becomes the lowest, and hence the lowest phase difference position and the lowest speed position W (see FIG. 2) coincide with each other.

A state where the first elastic body 201 and the driven body 207 are in contact with each other via substantially entire surfaces thereof and a state where the contact area is small occur twice per one rotation of the driven body 207. Therefore, in the phase difference profile detected in the step S1203, assuming that 360 pulses of the drive signal correspond to one rotation of the driven body 207, the phase difference is detected in a cycle of 180 pulses. That is, it is understood from the rotational position and the AS phase difference detected while driving the driven body 207 through several rotations that a position where the phase difference takes the smallest value appears twice per one rotation. In FIG. 11, the rotational positions 150 and 330 are the lowest phase difference positions. Therefore, in the step S1204, the MPU 32 determines the rotational position 150 which is smallest in value as the lowest phase difference position W, and stores the value of the rotational position 150 in the RAM thereof.

In the step S1205 et seq., the normal driving (position designation movement) of the vibration actuator 200 is performed. In the first embodiment, the relationship between the positions in the first elastic body 201 at which the amount of displacement of the vibration amplitude is large and the convex portions of the driven body 207 is detected by using an output from the position detection sensor 35 in the first embodiment, whereas in the third embodiment, the same relationship is detected by using the AS phase difference detected by the phase difference detection circuit 39. That is, the first embodiment and the third embodiment are distinguished only in the method of detecting a rotational position where the rotational speed of the driven body 207 becomes the lowest, but are the same in the other methods of performing drive control of the vibration actuator 200. Therefore, details of processing in the steps S1205 to S1212 are the same as details of the processing in the steps S505 to S512 described with reference to FIG. 5 in the first embodiment, and hence description thereof is omitted.

Note that in the present embodiment, in the step S1204, the lowest phase difference position is defined as a position where a position in the first elastic body 201 at which the vibration amplitude becomes large and a convex portion of the driven body 207 coincide with each other. But, depending on a set AB phase difference and conditions of a friction sliding surface between the first elastic body 201 and the driven body 207, there can be a case where a position at which the AS phase difference takes the largest value is the position where the position in the first elastic body 201 at which the vibration amplitude is large and the convex portion of the driven body 207 coincide with each other. To overcome this inconvenience, it is only required to set the lowest phase difference position appropriately based on the set AB phase difference and the conditions of the friction sliding surfaces of the first elastic body 201 and the driven body 207.

Although similar to the first embodiment, in the third embodiment as well, the number of times of switching the largest amplitude positions in the first elastic body 201 is 2, this is not limitative, but by changing the AB voltage ratio or the like, it is possible to increase the number of times of switching the largest amplitude positions in the first elastic body 201. This makes it possible to realize smoother low-speed driving.

Although in the above-described first to third embodiments, the description has been given of the case where the convex portions of the driven body are formed at substantially equally-spaced intervals, by way of example, the configuration of the driven body of the present invention is not limited to this. Therefore, the number of convex portions of the driven body may be one, or a plurality of convex portions may be formed at unequally-spaced intervals.

Figure 19A:
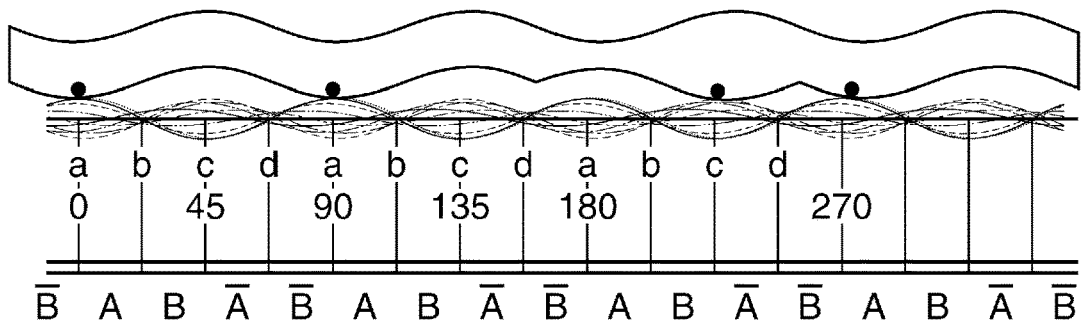
FIGS. 19A to 19C are diagrams showing contact states between a vibrating body and a driven body of a vibration actuator in a case where the driven body has convex portions irregularly formed thereon, and driven states of the vibration actuator.
Figure 19B:
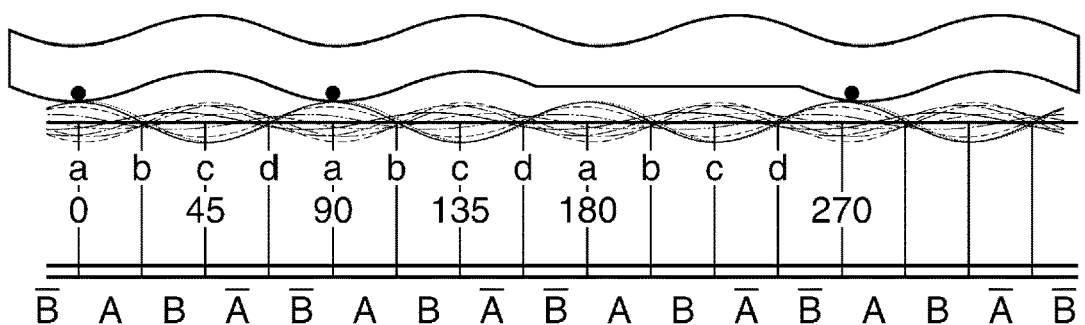
Figure 19C:
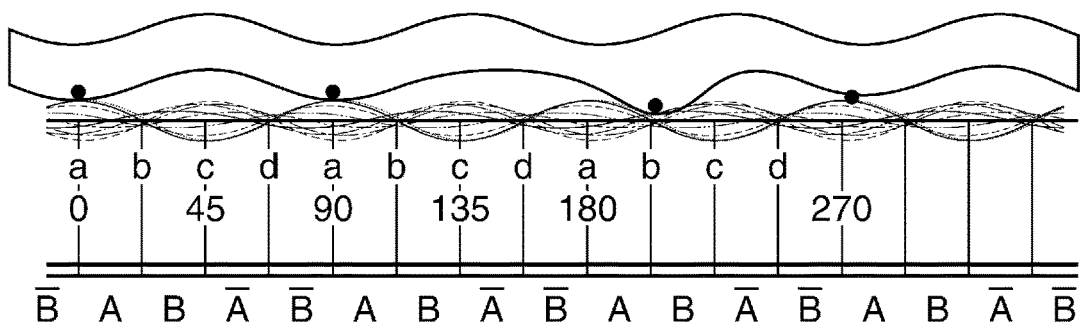

For example, as shown in FIG. 19A, at least one of the plurality of convex portions may be formed at a position corresponding to a position in an opposite phase of the progressive vibration to the other convex portions. Further, as in shown in FIG. 19B, a plurality of convex portions may be formed at irregularly spaced intervals at positions corresponding to positions in the same phase of the progressive vibration. Furthermore, as shown in FIG. 19C, a plurality of convex portions of the driven body may have different heights, and at least one (three in FIG. 19C) of the convex portions may be formed such that it is brought into contact with the first elastic body at a position where the amplitude of the progressive vibration becomes the largest.

Even when the driven body has such a shape as described above, it is possible to obtain the advantageous effects of the present invention.

Figure 13:
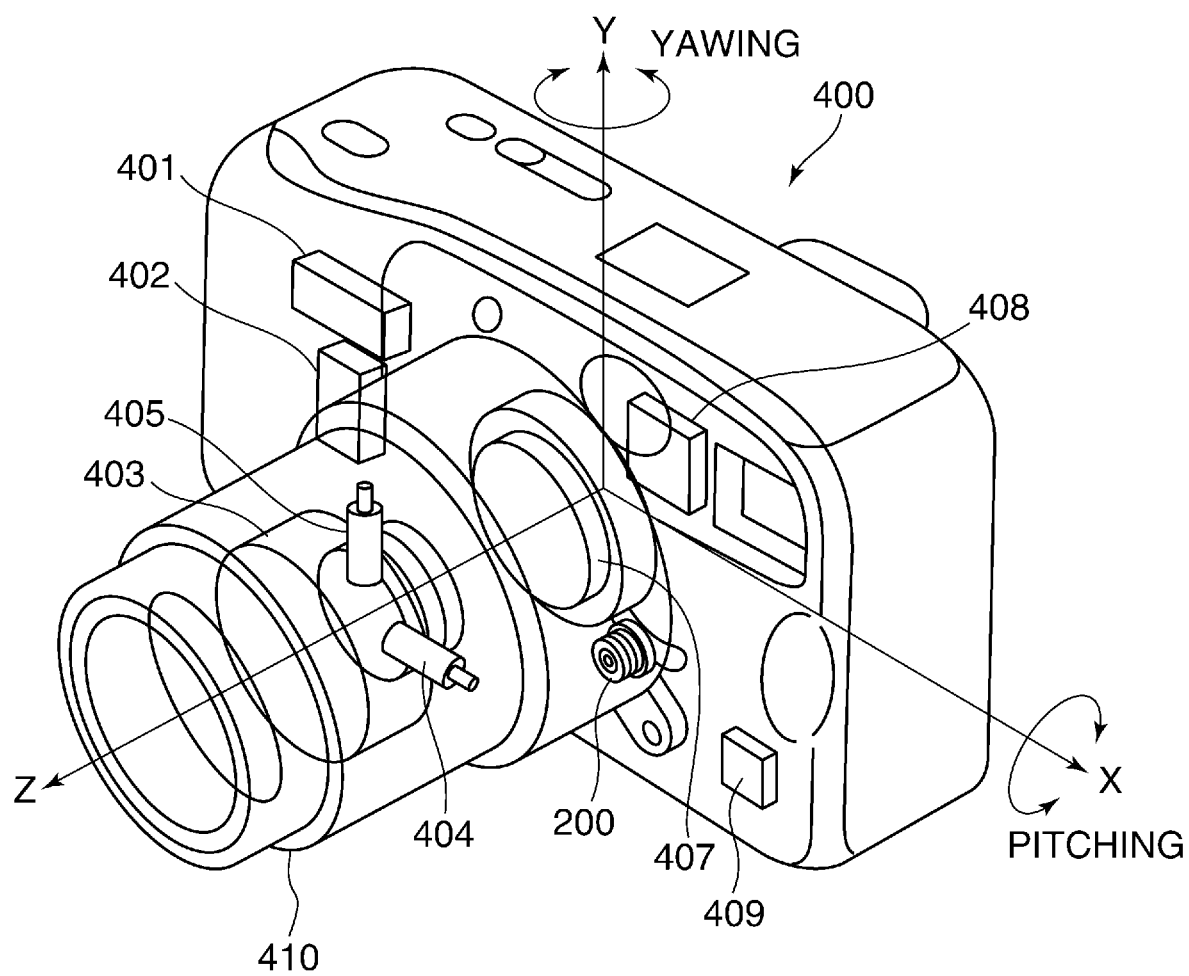
FIG. 13 is a perspective view of a digital camera as an example of an image pickup apparatus including the drive device shown in FIG. 1.

Next, a fourth embodiment of the present invention will be described. Similar to the first to third embodiments, a drive device according to the fourth embodiment has the same hardware configuration as that of the drive device shown in FIG. 1, and hence components corresponding to those of the drive device shown in FIG. 1 are denoted by the same reference numerals, and description thereof is omitted. The drive device according to the fourth embodiment is applied to the image pickup apparatus as an electronic apparatus equipped with the above-described vibration actuator 200. FIG. 13 is a schematic perspective view of a digital camera 400, shown in a partially transparent state, as an example of the image pickup apparatus.

In a front side of the digital camera 400, there is mounted a lens barrel 410. The lens barrel 410 is provided with a plurality of lenses, not shown, including a focus lens 407 and a hand shake correction optical system 403. The hand shake correction optical system 403 is configured to be capable of vibrating in a vertical direction (Y direction) and in a horizontal direction (X direction) by having rotations of biaxial coreless motors 404 and 405 transmitted thereto.

An image pickup element 408 is provided in a body of the digital camera 400. Light having passed through the lens barrel 410 forms an optical image on the image pickup element 408. The image pickup element 408 is formed by a photoelectric conversion device, such as a CMOS sensor or a CCD sensor, and converts the optical image to an analog electric signal. The analog electric signal output from the image pickup element 408 is converted to a digital signal by an analog-to-digital converter, not shown, and then is stored as image data (video data) in a storage device, such as a semiconductor memory, not shown, after being subjected to predetermined image processing by an image processing circuit, not shown.

Further, a gyro sensor 401 for detecting the amount of hand shake (vibration) in the vertical direction (pitching), and a gyro sensor 402 for detecting the amount of hand shake (vibration) in the horizontal direction (yawing) are arranged as internal devices in the body of the digital camera 400. The coreless motors 404 and 405 are driven in directions opposite to the directions of the vibrations detected by the gyro sensors 401 and 402, to vibrate the optical axis extending in a Z direction of the hand shake correction optical system 403. As a consequence, the vibration of the optical axis caused by hand shake is cancelled out, whereby it is possible to take an excellent photograph in which hand shake is corrected.

The vibration actuator 200 is driven by the driving method described in the first to third embodiments, and drives the focus lens 407 provided in the lens barrel 410 in an optical axis direction (Z direction) via a gear train, not shown. However, this is not limitative, but the vibration actuator 200 can be used for driving desired lenses, such as a zoom lens, not shown. The drive device shown in FIG. 1, for driving the vibration actuator 200 by any of the drive methods described in the first to third embodiments, is incorporated as a drive circuit 409, in the body of the digital camera 400.

Note that in the above-described embodiments, the oscillator 34, the first switching circuit 33*a*, the second switching circuit 33*b*, and the MPU 32 correspond to a drive unit of the present invention, the position detection sensor 35 and the MPU 32 correspond to an acquisition unit, and the MPU 32 corresponds to a control unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Although in the above description, the driven body is rotated by generating progressive vibration in the elastic body having an annular shape, by way of example, this is not limitative, but the same drive control as in any of the first to third embodiments can be applied to a vibration actuator in which an elastic body moves relative to a driven body, by using the drive device shown in FIG. 1.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

REFERENCE SIGNS LIST

32 MPU (microcomputer)
33*a* first switching circuit
33*b* second switching circuit
35 position detection sensor
37 first differential amplifier
38 second differential amplifier
39 phase difference detection circuit
407 focus lens
408 image pickup element
409 drive circuit
200, 600 vibration actuator

The invention claimed is:

1. A drive device for a vibration actuator that includes a vibrating body and a driven body in contact with each other, comprising:
   a drive unit configured to apply a first drive signal and a second drive signal to an electromechanical energy conversion element of the vibrating body;
   an acquisition unit configured to acquire information on a relative position between the vibrating body and the driven body; and
   a control unit configured to switch the first drive signal and the second drive signal to a third drive signal and a fourth drive signal, respectively, based on the relative position by switching a phase difference between the first drive signal and the second drive signal such that an envelope of a bundle of vibration waves generated based on the third drive signal and the fourth drive signal follows variation of the relative position between the vibrating body and the driven body.

2. The drive device according to claim 1, wherein switching of the first drive signal and the second drive signal to the third drive signal and the fourth drive signal is performed by fixing one of the first drive signal and the second drive signal, and changing the other drive signal.

3. The drive device according to claim 1, wherein the acquisition unit sets a predetermined number of pulses for a predetermined amount of movement of the driven body with respect to the vibrating body, and acquires the relative position between the vibrating body and the driven body as a value of the number of pulses.

4. The drive device according to claim 1, wherein both the vibrating body and the driven body have an annular shape and are arranged coaxially with each other,
   wherein the first drive signal and the second drive signal are applied to the electromechanical energy conversion element with a predetermined phase difference, whereby progressive vibration is excited in the vibrating body,
   wherein the driven body has convex portions protruding toward the vibrating body on a sliding surface that slides on the vibrating body, and
   wherein the control unit switches the first drive signal and the second drive signal to the third drive signal and the fourth drive signal, respectively, according to the relative movement between the vibrating body and the driven body, such that the convex portions of the driven body are brought into contact with the vibrating body at positions in a circumferential direction of the vibrating body at which the highest one of peaks of the amplitude of the progressive vibration generated in the vibrating body is formed, to thereby switch the position in the circumferential direction of the vibrating body at which the highest one of the peaks of the amplitude of the progressive vibration is formed.

5. The drive device according to claim 1, wherein the control unit stores a position at which a speed of the driven body with respect to the vibrating body becomes minimum or maximum when the electromechanical energy conversion element is driven in a state in which frequency of the first and second drive signals is not changed, and determines, with reference to the stored position, a position at which a highest one of peaks of amplitude of the progressive vibration generated in the vibrating body is formed.

6. The drive device according to claim 1, wherein the vibrating body includes a vibration detection unit configured to detect vibration generated in the vibrating body,
wherein the control unit stores a position at which a phase difference between a signal from the vibration detection unit and the first drive signal or the second drive signal becomes minimum or maximum when the electromechanical energy conversion element is driven in a state in which frequency of the first and second drive signals is not changed, and determines, with reference to the stored position, a position at which a highest one of peaks of amplitude of the progressive vibration generated in the vibrating body is formed.

7. An image pickup apparatus comprising:
a lens;
a vibration actuator that moves the lens in an optical axis direction;
an image pickup element that picks up an optical image formed by the lens; and
a drive device according to claim 1.

8. A vibration type driving apparatus comprising:
a vibrating body;
a driven body in contact with the vibrating body; and
the drive device according to claim 1.

9. The drive device according to claim 1, wherein convex portions of the envelope of the bundle of vibration waves generated based on the third drive signal and the fourth drive signal follow convex portions of the driven body, which moves relatively to the vibrating body.

10. The drive device according to claim 4, wherein the number of times of operation for switching the position in the circumferential direction of the vibrating body at which the highest one of the peaks of the amplitude of the progressive vibration is formed is at least t×m×2, assuming that the number of the convex portions of the driven body is represented by t, and the number of waves of vibration formed per circumference of the vibrating body, which is calculated from an electrode pattern of the electromechanical energy conversion element, is represented by m.

11. A method of controlling a drive device for driving a vibration actuator that includes a vibrating body and a driven body in contact with each other, the method comprising:
applying a first drive signal and a second drive signal to an electromechanical energy conversion element of the vibrating body;
acquiring information on a relative position between the vibrating body and the driven body; and
switching the first drive signal and the second drive signal to a third drive signal and a fourth drive signal, respectively, based on the relative position by switching a phase difference between the first drive signal and the second drive signal such that an envelope of a bundle of vibration waves generated based on the third drive signal and the fourth drive signal follows variation of the relative position between the vibrating body and the driven body.

12. The method of controlling the drive device according to claim 11, wherein convex portions of the envelope of the bundle of vibration waves generated based on the third drive signal and the fourth drive signal follow convex portions of the driven body, which moves relatively to the vibrating body.

13. A method of driving a vibration actuator including a vibrating body and a driven body in contact with the each other, the method comprising:
applying a first drive signal and a second drive signal having a predetermined frequency to an electromechanical energy conversion element of the vibrating body with a fixed phase difference;
acquiring a speed profile indicative of a relationship between a position and a speed of the driven body with respect to the vibrating body;
detecting a lowest-speed position at which the speed of the driven body becomes lowest, from the acquired speed profile; and
acquiring information on a relative position between the driven body and the vibrating body, and switching the first drive signal and the second drive signal to a third drive signal and a fourth drive signal, respectively, based on the relative position and the lowest-speed position, by switching a phase difference between the first drive signal and the second drive signal such that an envelope of a bundle of vibration waves generated based on the third drive signal and the fourth drive signal follows variation of the relative position between the vibrating body and the driven body.

14. The method of driving the vibration actuator according to claim 13, wherein convex portions of the envelope of the bundle of vibration waves generated based on the third drive signal and the fourth drive signal follow convex portions of the driven body, which moves relatively to the vibrating body.

15. A method of driving a vibration actuator including a vibrating body and a driven body in contact with each other, the method comprising:
applying a first drive signal and a second drive signal having a predetermined frequency to an electromechanical energy conversion element of the vibrating body with a fixed phase difference;
detecting vibration generated in the vibrating body;
acquiring a phase difference profile indicative of a relationship between a position of the driven body with respect to the vibrating body, and a phase difference between a signal produced by detecting the vibration and the first drive signal or the second drive signal;
detecting a lowest-phase difference position at which the phase difference becomes lowest, from the acquired phase difference profile; and
acquiring information on a relative position between the driven body and the vibrating body, and switching the first drive signal and the second drive signal to a third drive signal and a fourth drive signal, respectively, based on the relative position and the lowest-phase difference position, by switching a phase difference between the first drive signal and the second drive signal such that an envelope of a bundle of vibration waves generated based on the third drive signal and the fourth drive signal follows variation of the relative position between the vibrating body and the driven body.

16. The method of driving the vibration actuator according to claim 15, wherein convex portions of the envelope of the bundle of vibration waves generated based on the third drive signal and the fourth drive signal follow convex portions of the driven body, which moves relatively to the vibrating body.

* * * * *